United States Patent
Moon et al.

(10) Patent No.: US 12,356,455 B2
(45) Date of Patent: *Jul. 8, 2025

(54) SIGNAL TRANSMISSION AND RECEPTION METHOD FOR UNLICENSED BAND COMMUNICATION, AND APPARATUS THEREFOR

(71) Applicant: ELECTRONICS AND TELECOMMUNICATIONS RESEARCH INSTITUTE, Daejeon (KR)

(72) Inventors: Sung Hyun Moon, Daejeon (KR); Cheul Soon Kim, Daejeon (KR); Jung Hoon Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/514,149

(22) Filed: Nov. 20, 2023

(65) Prior Publication Data
US 2024/0090035 A1   Mar. 14, 2024

Related U.S. Application Data

(63) Continuation of application No. 17/426,490, filed as application No. PCT/KR2020/001682 on Feb. 6, 2020, now Pat. No. 11,864,232.
(Continued)

(30) Foreign Application Priority Data

Feb. 15, 2019   (KR) .................. 10-2019-0017974
Apr. 3, 2019    (KR) .................. 10-2019-0039259
(Continued)

(51) Int. Cl.
*H04W 74/0816*   (2024.01)
*H04L 27/26*     (2006.01)
(Continued)

(52) U.S. Cl.
CPC ... *H04W 74/0816* (2013.01); *H04L 27/26025* (2021.01); *H04L 27/2607* (2013.01);
(Continued)

(58) Field of Classification Search
CPC ......... H04W 74/0808; H04W 74/0816; H04W 74/08; H04W 74/0866; H04W 72/04;
(Continued)

(56) References Cited

U.S. PATENT DOCUMENTS 11,678,367 B2 *  6/2023  Zhang ............... H04W 74/0808
                                                      370/329
2013/0235783 A1 * 9/2013  Wang ..................... H04B 7/024
                                                      370/312
(Continued)

FOREIGN PATENT DOCUMENTS

KR  10-2018-0049750 A     5/2018
WO  WO-2019017614 A1 *    1/2019 .............. H04J 11/00
(Continued)

OTHER PUBLICATIONS

Huawei et al., "Grant-free transmission for UL URLLC", 3GPP TSG RAN WG1 Meeting #89, R1-1706919, Hangzhou, China, May 15-19, 2017.
(Continued)

*Primary Examiner* — Warner Wong
(74) *Attorney, Agent, or Firm* — LRK PATENT LAW FIRM

(57) ABSTRACT

A method by which a terminal operating in an unlicensed band transmits a signal includes the steps of: receiving, from a base station, configuration information about a carrier;
(Continued)

receiving configuration information for configuring N (where N is an integer) guard band(s) for some frequency domains of the carrier; and transmitting a signal to the base station by using a first frequency domain of a bandwidth part belonging to the carrier, wherein the first frequency domain can be a domain excluding the N guard band(s) from the frequency domain of the bandwidth part.

20 Claims, 20 Drawing Sheets

Related U.S. Application Data

(60) Provisional application No. 62/810,356, filed on Feb. 25, 2019.

(30) Foreign Application Priority Data

| | | |
|---|---|---|
| Apr. 18, 2019 | (KR) | 10-2019-0045756 |
| May 14, 2019 | (KR) | 10-2019-0056551 |
| Oct. 2, 2019 | (KR) | 10-2019-0122633 |
| Oct. 17, 2019 | (KR) | 10-2019-0128799 |

(51) Int. Cl.
*H04W 72/044* (2023.01)
*H04W 74/08* (2009.01)
*H04L 41/0806* (2022.01)

(52) U.S. Cl.
CPC ..... *H04W 72/044* (2013.01); *H04W 74/0866* (2013.01); *H04L 41/0806* (2013.01)

(58) Field of Classification Search
CPC ............... H04W 72/044; H04W 76/10; H04L 27/2602; H04L 27/26025; H04L 27/2605; H04L 27/2607; H04L 27/2646; H04L 27/2666; H04L 41/08; H04L 41/0806; H04L 47/70; H04L 47/72
See application file for complete search history.

(56) References Cited

U.S. PATENT DOCUMENTS

| | | | |
|---|---|---|---|
| 2017/0134236 A1* | 5/2017 | Patel | H04L 5/1469 |
| 2017/0181182 A1* | 6/2017 | Patel | H04L 5/0048 |
| 2017/0188347 A1* | 6/2017 | Chen | H04W 72/20 |
| 2018/0048511 A1 | 2/2018 | Hakola et al. | |
| 2018/0124687 A1 | 5/2018 | Park et al. | |
| 2018/0146478 A1* | 5/2018 | Kim | H04W 72/23 |
| 2018/0288624 A1 | 10/2018 | Zhang et al. | |
| 2018/0317244 A1 | 11/2018 | Um et al. | |
| 2018/0317256 A1 | 11/2018 | Um et al. | |
| 2019/0014483 A1 | 1/2019 | Kwak et al. | |
| 2019/0037509 A1 | 1/2019 | Li et al. | |
| 2019/0069228 A1 | 2/2019 | Malik et al. | |
| 2019/0098611 A1* | 3/2019 | Shimezawa | H04W 72/23 |
| 2019/0281610 A1 | 9/2019 | Choi et al. | |
| 2021/0127411 A1* | 4/2021 | Zhang | H04L 5/003 |
| 2022/0166475 A1* | 5/2022 | Park | H04L 27/26 |

FOREIGN PATENT DOCUMENTS

| | | |
|---|---|---|
| WO | 2019/028675 A1 | 2/2019 |
| WO | 2019/031884 A1 | 2/2019 |

OTHER PUBLICATIONS

Search Report, mailed May 28, 2020, for International Application No. PCT/KR2020/001682.
Written Opinion, mailed May 28, 2020, for International Application No. PCT/KR2020/001682.

* cited by examiner

FIG. 1
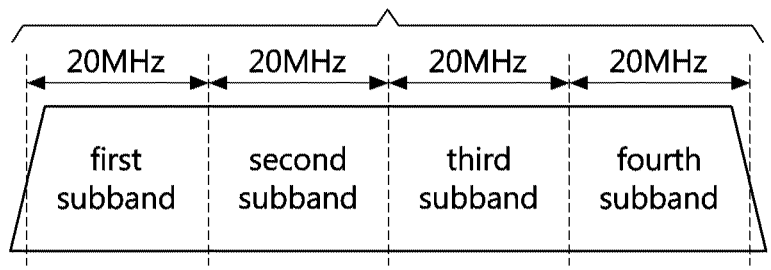
(a)
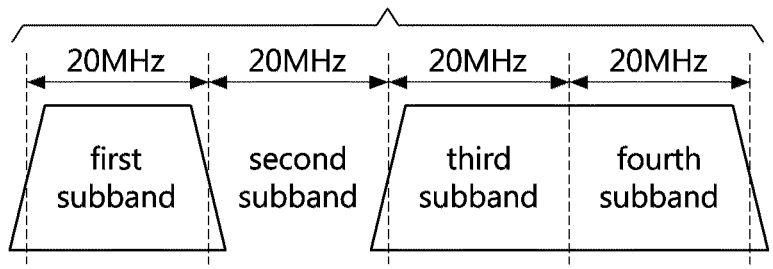
(b)
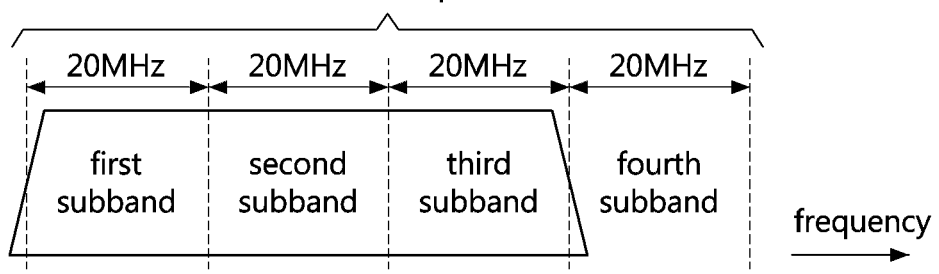
(c)

SIGNAL TRANSMISSION AND RECEPTION METHOD FOR UNLICENSED BAND COMMUNICATION, AND APPARATUS THEREFOR

CROSS-REFERENCE TO RELATED APPLICATIONS

The present application is a continuation of U.S. patent application Ser. No. 17/426,490, filed on Jul. 28, 2021, which was a U.S. National Phase entry from International Application No. PCT/KR2020/001682, filed on Feb. 6, 2020, which claimed the benefit of U.S. Provisional Application No. 62/810,356, filed on Feb. 25, 2019, and claimed priority to Korean Patent Application Nos. 10-2019-0017974, filed on Feb. 15, 2019, 10-2019-0039259, filed on Apr. 3, 2019, 10-2019-0045756, filed on Apr. 18, 2019, 10-2019-0056551, filed on May 14, 2019, 10-2019-0122633, filed on Oct. 2, 2019, and 10-2019-0128799, filed on Oct. 17, 2019, the disclosures of which are incorporated by reference herein in their entireties.

BACKGROUND

1. Technical Field

The present invention relates to methods for transmitting or receiving signals in a communication system and apparatuses for the same, and more specifically, to methods for transmitting or receiving signals through a wide frequency band in a mobile communication system supporting unlicensed band communications, and apparatuses for the same.

2. Description of Background Art

The communication system (hereinafter, a new radio (NR) communication system) using a higher frequency band (e.g., a frequency band of 6 GHz or higher) than a frequency band (e.g., a frequency band lower below 6 GHz) of the long term evolution (LTE) (or, LTE-A) is being considered for processing of soaring wireless data. The NR communication system may support not only a frequency band below 6 GHz but also 6 GHz or higher frequency band, and may support various communication services and scenarios as compared to the LTE communication system. For example, usage scenarios of the NR communication system may include enhanced mobile broadband (eMBB), ultra-reliable low-latency communication (URLLC), massive machine type communication (mMTC), and the like.

Meanwhile, communications using an unlicensed band have been attracting attention as a solution to the increase in data demand. Currently, communication technologies that use unlicensed bands include LTE-Unlicensed (LTE-U), Licensed-Assisted-Access (LAA), MultiFire, and the like. In addition to the existing functions, the NR communication system can support a standalone mode that independently operates only in an unlicensed band. However, an initial access procedure, a signal transmission procedure, a channel access scheme suitable for a flexible frame structure, a wideband carrier operation, and the like in the unlicensed band are not yet clearly defined. In this reason, operations of a base station and terminals for the above-described technical elements need to be clearly defined.

SUMMARY

An objective of the present invention for solving the above-described problem is directed to providing methods for configuring a listen before talk (LBT) subband in a communication system operating in an unlicensed band, and transmitting or receiving a signal by using the LBT subband.

An objective of the present invention for solving the above-described problem is directed to providing methods for transmitting or receiving a signal by using a guard band of an LBT subband in a communication system operating in an unlicensed band.

An objective of the present invention for solving the above-described problem is directed to providing methods for mapping a data channel to resource elements (REs) by considering an LBT subband and a guard band in a communication system operating in an unlicensed band.

An objective of the present invention for solving the above-described problem is directed to providing methods for configuring a discovery reference signal (DRS) resource, methods for transmitting a DRS, and methods for measuring a DRS in a communication system operating in an unlicensed band.

An exemplary embodiment of the present invention for achieving the objective, as a method for transmitting a signal, performed by a terminal operating in an unlicensed band, may comprise receiving configuration information of a carrier from a base station; receiving configuration information for configuring a part of a frequency region of the carrier as N guard band(s), wherein N is a natural number; and transmitting a signal to the base station using a first frequency region of a bandwidth part belonging to the carrier, wherein the first frequency region is a region excluding the N guard band(s) in a frequency region of the bandwidth part.

The frequency region of the carrier may be composed of one or a plurality of consecutive resource blocks (RBs), each of the guard band(s) is composed of zero or more consecutive RB(s) among the RB(s) constituting the carrier, and the configuration information for configuring the N guard band(s) includes information related to a starting RB and an ending RB of each guard band.

The frequency region of the carrier may be divided into (N+1) subbands based on the N guard band(s), and each of the subbands may be composed of one or a plurality of consecutive RB(s).

A starting RB of a first subband among the (N+1) subbands may be a starting RB of the carrier, and an ending RB of the first subband may be an RB having an index one lower than an index of a starting RB of a first guard band; a starting RB of an n-th subband (n=2, . . . , N) among the (N+1) subbands may be an RB having an index one higher than an index of an ending RB of an (n−1)-th guard band, and an ending RB of the n-th subband may be an RB having an index one lower than an index of a starting RB of an n-th guard band; and a starting RB of an (N+1)-th subband among the (N+1) subbands may be an RB having an index one higher than an index of an ending RB of an N-th guard band, and an ending RB of the (N+1)-th subband is an ending RB of the carrier.

The bandwidth part may include at least part of the (N+1) subbands.

The configuration information for configuring the N guard band(s) may be received through radio resource control (RRC) signaling.

The signal may include an uplink data channel, and the uplink data channel may be mapped to the first frequency region in an interlace structure.

The bandwidth part may be acquired in an initial access procedure of the terminal, or may be configured from the base station.

The method may further comprise receiving indication information indicating activation of at least part of the N guard band(s) from the base station; and from a time point indicated by the indication information, transmitting a signal to the base station using a second frequency region including the activated at least part of the N guard band(s) in the frequency region of the bandwidth part.

The indication information may be received from the base station through at least one of RRC signaling, downlink control information (DCI), and a medium access control (MAC) control element (CE).

Another exemplary embodiment of the present invention for achieving the objective, as a method for receiving a signal, performed by a base station operating in an unlicensed band, may comprise transmitting configuration information of a carrier to a terminal; transmitting configuration information for configuring a part of a frequency region of the carrier as N guard band(s), wherein N is a natural number; and receiving a signal from the terminal using a first frequency region of a bandwidth part belonging to the carrier, wherein the first frequency region is a region excluding the N guard band(s) in a frequency region of the bandwidth part.

The frequency region of the carrier may be composed of one or a plurality of consecutive resource blocks (RBs), each of the guard band(s) may be composed of zero or more consecutive RB(s) among the RB(s) constituting the carrier, and the configuration information for configuring the N guard band(s) may include information related to a starting RB and an ending RB of each guard band.

The frequency region of the carrier may be divided into (N+1) subbands based on the N guard band(s), and each of the subbands may be composed of one or a plurality of consecutive RB(s).

A starting RB of a first subband among the (N+1) subbands may be a starting RB of the carrier, and an ending RB of the first subband may be an RB having an index one lower than an index of a starting RB of a first guard band; a starting RB of an n-th subband (n=2, . . . , N) among the (N+1) subbands may be an RB having an index one higher than an index of an ending RB of an (n−1)-th guard band, and an ending RB of the n-th subband may be an RB having an index one lower than an index of a starting RB of an n-th guard band; and a starting RB of an (N+1)-th subband among the (N+1) subbands may be an RB having an index one higher than an index of an ending RB of an N-th guard band, and an ending RB of the (N+1)-th subband may be an ending RB of the carrier.

The bandwidth part may include at least part of the (N+1) subbands.

The configuration information for configuring the N guard band(s) may be transmitted through radio resource control (RRC) signaling.

The signal may include an uplink data channel, and the uplink data channel may be mapped to the first frequency region in an interlace structure.

The bandwidth part may be acquired by the terminal in an initial access procedure of the terminal, or may be configured by the base station to the terminal.

The method may further comprise transmitting indication information indicating activation of at least part of the N guard band(s) from the terminal; and from a time point indicated by the indication information, receiving a signal from the terminal using a second frequency region including the activated at least part of the N guard band(s) in the frequency region of the bandwidth part.

The indication information may be transmitted to the terminal through at least one of RRC signaling, downlink control information (DCI), and a medium access control (MAC) control element (CE).

According to the exemplary embodiments of the present invention as described above, methods for configuring an LBT subband in a communication system (e.g., NR-U system) operating in an unlicensed band may be defined. In addition, a guard band corresponding to the LBT subband may be used for signal transmission, thereby improving resource efficiency. In addition, methods of configuring resources of a DRS, methods for transmitting a DRS, and methods for measuring a DRS may be defined for the communication system operating in an unlicensed band.

BRIEF DESCRIPTION OF DRAWINGS

FIG. 1 is a conceptual diagram illustrating configuration of LBT subbands according to exemplary embodiments of the present invention.

DETAILED DESCRIPTION OF THE INVENTION

Figure 2:
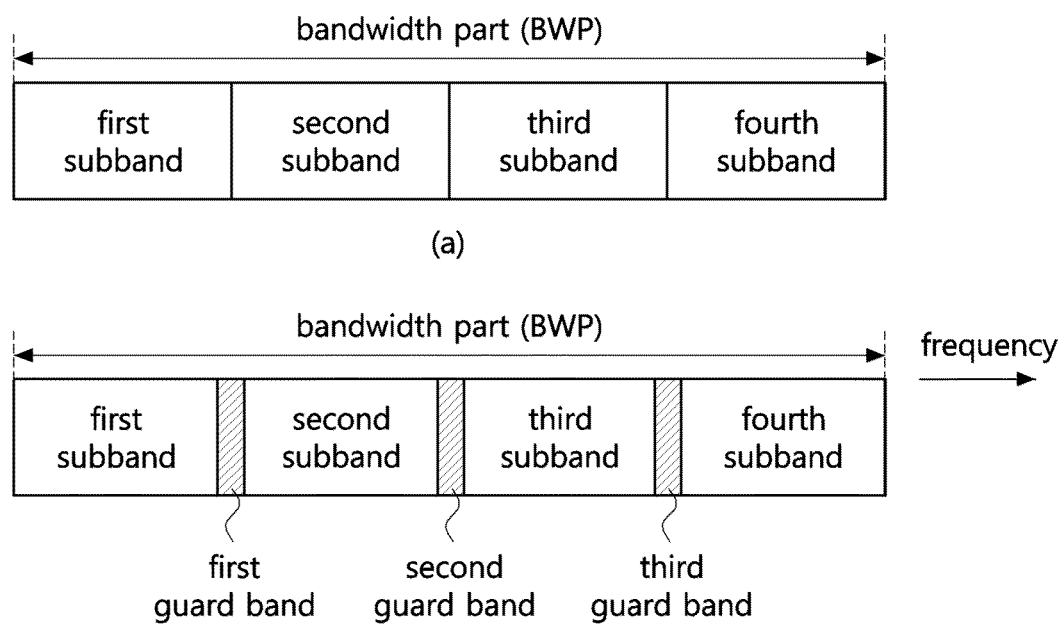
FIG. 2 is a conceptual diagram illustrating configuration of LBT subbands according to other exemplary embodiments of the present invention.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, preferable exemplary embodiments of the present invention will be described in greater detail with reference to the accompanying drawings. In order to facilitate general understanding in describing the present invention, the same components in the drawings are denoted with the same reference signs, and repeated description thereof will be omitted.

A wireless communication system to which exemplary embodiments according to the present invention are applied will be described. The wireless communication system to which the exemplary embodiments according to the present invention are applied is not limited to the contents described below, and the exemplary embodiments according to the present invention may be applied to various wireless communication systems.

The present invention relates to methods for transmitting or receiving signals in a communication system supporting an unlicensed band, and more particularly, to methods for performing channel access and signal transmission using a wide frequency band of an unlicensed band, and apparatuses for the same. For convenience of description, a communication system to which exemplary embodiments according to the present invention are applied will be described using the NR communication system as an example, but the spirit or the exemplary embodiments of the present invention can be applied to various communication systems without being limited thereto. In addition, the present invention is for communications in an unlicensed band, but the spirit or the exemplary embodiment of the present invention can be easily applied to communication and various applications of a licensed band.

The NR communication system may support a wider system bandwidth (e.g., carrier bandwidth) than a system bandwidth provided by the LTE communication system in order to efficiently use a wide frequency band. For example, the maximum system bandwidth supported by the LTE communication system may be 20 MHz. On the other hand, the NR communication system may support a carrier bandwidth of up to 100 MHz in the frequency band of 6 GHz or below, and support a carrier bandwidth of up to 400 MHz in the frequency band of 6 GHz or above.

In order to satisfy various technical requirements, a numerology applied to physical signals and channels in the NR communication system may vary. In the communication system to which a cyclic prefix (CP) based OFDM waveform technology is applied, the numerology may include a subcarrier spacing and a CP length (or CP type). Table 1 below may be a first exemplary embodiment of configuration of numerologies for the CP-based OFDM. The subcarrier spacings may have a power of two multiplication relationship, and the CP length may be scaled at the same ratio as the OFDM symbol length. Depending on a frequency band in which the communication system operates, some of the numerologies of Table 1 may be supported. When the subcarrier spacing is 60 kHz, an extended CP may be additionally supported.

TABLE 1

| Subcarrier spacing | 15 kHz | 30 kHz | 60 kHz | 120 kHz | 240 kHz |
|---|---|---|---|---|---|
| OFDM symbol length [μs] | 66.7 | 33.3 | 16.7 | 8.3 | 4.2 |

TABLE 1-continued

| Subcarrier spacing | 15 kHz | 30 kHz | 60 kHz | 120 kHz | 240 kHz |
|---|---|---|---|---|---|
| CP length [µs] | 4.76 | 2.38 | 1.19 | 0.60 | 0.30 |
| Number of OFDM symbols within 1 ms | 14 | 28 | 56 | 112 | 224 |

In the following description, a frame structure in the communication system (e.g., NR communication system) will be described. In the time domain, a building block may be a subframe, a slot, and/or a minislot. The subframe may be used as a transmission unit, and the length of the subframe may have a fixed value (e.g., 1 ms) regardless of the subcarrier spacing. The slot may comprise 14 consecutive OFDM symbols. The length of the slot may be variable differently from the length of the subframe, and may be inversely proportional to the subcarrier spacing. The slot may be used as a scheduling unit and may be used as a configuration unit of scheduling and hybrid automatic repeat request (HARQ) timing.

The base station may schedule a data channel (e.g., physical downlink shared channel (PDSCH), physical uplink shared channel (PUSCH), or physical sidelink shared channel (PSSCH)) using a part of the slot or an entire slot. Alternatively, the base station may schedule a data channel using a plurality of slots. The minislot may be used as a transmission unit, and the length of the minislot may be set shorter than the length of the slot. A slot having a length shorter than the length of the conventional slot may be referred to as a 'minislot' in the communication system. A physical downlink control channel (PDCCH) monitoring period and/or a duration of the data channel may be configured to be shorter than the conventional slot, such that minislot-based transmission can be supported.

The minislot may refer to a scheduling or transmission unit having a shorter length than the slot. The minislot based scheduling may be used for transmission of a partial slot, URLLC transmission, analog beamforming based multi-user scheduling, etc. in an unlicensed band or in a band where the NR and the LTE coexist. The NR may support the minislot-based transmission by configuring the physical downlink control channel (PDCCH) monitoring period and the duration of the data channel shorter than the conventional slot.

In the frequency domain, a building block may be a physical resource block (PRB). One PRB may comprise 12 consecutive subcarriers regardless of the subcarrier spacing. Thus, a bandwidth occupied by one PRB may be proportional to the subcarrier spacing of the numerology. The PRB may be used as a frequency-domain resource allocation unit of the control channel and/or data channel. The minimum resource allocation unit of the downlink control channel may be a control channel element (CCE). One CCE may include one or more PRBs. The minimum resource allocation (e.g., bitmap-based resource allocation) unit of the data channel may be a resource block group (RBG). One RBG may include one or more PRBs.

A slot (e.g., slot format) may be composed of a combination of one or more of downlink duration, flexible duration or unknown duration (hereinafter collectively referred to as 'flexible duration'), and an uplink duration. Each of the downlink duration, the flexible duration, and the uplink duration may be comprised of one or more consecutive symbols. The flexible duration may be located between the downlink duration and the uplink duration, between a first downlink duration and a second downlink duration, or between a first uplink duration and a second uplink duration. When the flexible duration is inserted between the downlink duration and the uplink duration, the flexible duration may be used as a guard period. One slot may include a plurality of flexible durations. Alternatively, one slot may not include a flexible duration. The terminal may perform a predefined operation or an operation configured by the base station semi-statically or periodically (e.g., a PDCCH monitoring operation, a synchronization signal/physical broadcast channel (SS/PBCH) block reception and measurement operation, a channel state information-reference signal (CSI-RS) reception and measurement operation, a downlink semi-persistent scheduling (SPS) PDSCH reception operation, a sounding reference signal (SRS) transmission operation, a physical random access channel (PRACH) transmission operation, a periodically-configured PUCCH transmission operation, a PUSCH transmission operation according to a configured grant, or the like) in the corresponding flexible duration until the corresponding flexible duration is overridden to be a downlink duration or an uplink duration. Alternatively, the terminal may not perform any operation in the corresponding flexible duration until the corresponding flexible duration is overridden to be a downlink duration or an uplink duration.

The slot format may be configured semi-statically by higher layer signaling (e.g. radio resource control (RRC) signaling). Information indicating a semi-static slot format may be included in system information, and the semi-static slot format may be configured in a cell-specific manner. For example, the cell-specific slot format may be configured through an RRC parameter 'TDD-UL-DL-ConfigCommon'. In addition, the slot format may be additionally configured for each terminal through UE-specific higher layer signaling (e.g., RRC signaling). For example, the UE-specific slot format may be configured through an RRC parameter 'TDD-UL-DL-ConfigDedicated'. The flexible duration of the slot format configured in the cell-specific manner may be overridden by the UE-specific higher layer signaling to a downlink duration or an uplink duration. Also, the slot format may be dynamically indicated by a slot format indicator (SFI) included in downlink control information (DCI).

The terminal may perform most of downlink and uplink operations in a bandwidth part. The bandwidth part may be defined as a set of consecutive PRBs in the frequency domain. Only one numerology may be used for transmission of a control channel or a data channel in one bandwidth part. The terminal performing an initial access procedure may obtain configuration information of an initial bandwidth part from the base station through system information. A terminal operating in an RRC connected state may obtain the configuration information of the bandwidth part from the base station through UE-specific higher layer signaling.

The configuration information of the bandwidth part may include a numerology (e.g., a subcarrier spacing and a CP length) applied to the bandwidth part. Also, the configuration information of the bandwidth part may further include information indicating a position of a starting PRB of the bandwidth part and information indicating the number of PRBs constituting the bandwidth part. At least one bandwidth part of the bandwidth part(s) configured to the terminal may be activated. For example, within one carrier, one uplink bandwidth part and one downlink bandwidth part may be activated respectively. In a time division duplex (TDD) based communication system, a pair of one uplink bandwidth part and one downlink bandwidth part may be activated. If a plurality of bandwidth parts are configured for the terminal within one carrier, the active bandwidth part of the terminal may be switched.

In the present disclosure, the expression that a certain frequency band (e.g., carrier, bandwidth part, listen before talk (LBT) subband, guard band, etc.) is activated may mean that the certain frequency band is changed to a state in which a base station or a terminal can transmit or receive a signal by using the corresponding frequency band. In addition, an expression that a certain frequency band is activated may mean that the certain frequency band is changed to a state in which a radio frequency (RF) filter (e.g., band pass filter) of a transceiver is operating including the frequency band.

The minimum resource unit constituting the PDCCH may be a resource element group (REG). The REG may be composed of one PRB (e.g., 12 subcarriers) in the frequency domain and one OFDM symbol in the time domain. Thus, one REG may include 12 resource elements (REs). In the OFDM-based communication system, an RE may be a minimum physical resource unit composed of one subcarrier and one OFDM symbol. A demodulation reference signal (DMRS) for demodulating the PDCCH may be mapped to 3 REs among 12 REs constituting the REG, and control information (e.g., modulated DCI) may be mapped to the remaining 9 REs.

One PDCCH candidate may be composed of one CCE or aggregated CCEs. One CCE may be composed of a plurality of REGs. In the exemplary embodiments, a CCE aggregation level may be referred to as L, and the number of REGs constituting one CCE may be referred to as K. The communication system (e.g., NR communication system) may support 'K=6, L=1, 2, 4, 8 or 16'. The higher the CCE aggregation level, the more physical resources may be used for transmission of a PDCCH. In this case, by using a low code rate for the PDCCH transmission, the reception performance of the PDCCH can be improved.

A control resource set (CORESET) may be a resource region in which the terminal performs a blind decoding on PDCCHs. The CORESET may be composed of a plurality of REGs. The CORESET may consist of one or more PRBs in the frequency domain and one or more symbols (e.g., OFDM symbols) in the time domain. The symbols constituting one CORESET may be consecutive in the time domain. The PRBs constituting a single CORESET may be continuous or discontinuous in the frequency domain. One DCI (e.g., one PDCCH) may be transmitted within one CORESET or one search space logically associated with the CORESET. Multiple CORESETs may be configured with respect to a cell and a terminal, and the CORESETs may overlap each other.

The CORESET may be configured to the terminal by a PBCH (e.g., system information transmitted through the PBCH). The ID of the CORESET configured by the PBCH may be 0. That is, the CORESET configured by the PBCH may be referred to as a CORESET #0. A terminal operating in an RRC idle state may perform a monitoring operation in the CORESET #0 in order to receive a first PDCCH in the initial access procedure. Not only terminals operating in the RRC idle state but also terminals operating in the RRC connected state may perform monitoring operations in the CORESET #0. The CORESET may be configured to the terminal by other system information (e.g., system information block type 1 (SIB1)) other than the system information transmitted through the PBCH. For example, for reception of a random access response (or Msg2) in a random access procedure, the terminal may receive the SIB1 including the configuration information of the CORESET. Also, the CORESET may be configured to the terminal by UE-specific higher layer signaling (e.g., RRC signaling).

In each downlink bandwidth part, one or more CORESETs may be configured for the terminal. Here, the fact that the CORESET is configured in the bandwidth part means that the CORESET is logically associated with the bandwidth part and the terminal monitors the corresponding CORESET in the bandwidth part. The initial downlink active bandwidth part may include the CORESET #0 and may be associated with the CORESET #0. The CORESET #0 having a quasi-co-location (QCL) relationship with an SS/PBCH block may be configured for the terminal in a primary cell (PCell), a secondary cell (SCell), and a primary secondary cell (PSCell). In the secondary cell (SCell), the CORESET #0 may not be configured for the terminal.

A PDCCH candidate constituting the search space may consist of CCEs selected by a predefined hash function within an occasion of the CORESET or the search space. The search space may be defined and configured for each CCE aggregation level. In this case, a set of search spaces for all CCE aggregation levels may be referred to as a 'search space set'. In the embodiments, 'search space' may mean 'search space set', and 'search space set' may mean 'search space'.

A search space set may be logically associated with a single CORESET. One CORESET may be logically associated with one or more search space sets. A common search space set configured through the PBCH may be used to monitor a DCI scheduling a PDSCH for transmission of the SIB1. The ID of the common search space set configured through the PBCH may be set to 0. That is, the common search space set configured through the PBCH may be defined as a type 0 PDCCH common search space set or a search space set #0. The search space set #0 may be logically associated with the CORESET #0.

The search space set may be classified into a common search space set and a UE-specific search space set. A common DCI may be transmitted in the common search space set, and a UE-specific DCI may be transmitted in the UE-specific search space set. Considering degree of freedom in scheduling and/or fallback transmission, UE-specific DCIs may also be transmitted in the common search space set. For example, the common DCI may include resource allocation information of a PDSCH for transmission of system information, paging, power control commands, slot format indicator (SFI), preemption indicator, and the like. The UE-specific DCI may include PDSCH resource allocation information, PUSCH resource allocation information, and the like. A plurality of DCI formats may be defined according to the payload and the size of the DCI, the type of radio network temporary identifier (RNTI), or the like.

In the exemplary embodiments, the common search space may be referred to as a 'CSS', and the common search space set may be referred to as a 'CSS set'. Also, in the exemplary embodiments, the UE-specific search space may be referred to as a 'USS', and the UE-specific search space set may be referred to as a 'USS set'.

Exemplary embodiments of the present disclosure may be applied to various communication scenarios using an unlicensed band. For example, with assistance of a primary cell in a licensed band, a cell in the unlicensed band may be configured as a secondary cell, and a carrier of the secondary cell may be aggregated with another carrier. Alternatively, a cell in the unlicensed band (e.g., secondary cell) and a cell in the licensed band (e.g., primary cell) may support dual connectivity operations. Accordingly, the transmission capacity can be increased. Alternatively, a cell in the unlicensed band may independently perform functions of a primary cell. Alternatively, a downlink carrier of the licensed band may be combined with an uplink carrier of the unlicensed band, and the combined carriers may perform functions as one cell. On the other hand, an uplink carrier of the licensed band may be combined with a downlink carrier of the unlicensed band, and the combined carriers may perform functions as one cell. In addition, exemplary embodiments of the present disclosure may be applied to other communication system (e.g., communication systems supporting the licensed band) as well as communication systems supporting unlicensed bands.

In the communications of the unlicensed band, a contention-based channel access scheme may be used to satisfy spectrum regulation conditions and coexist with existing communication nodes (e.g., Wi-Fi stations). For example, a communication node desiring to access a channel in an unlicensed band may identify a channel occupancy state by performing a clear channel assessment (CCA) operation. A transmitting node (e.g., communication node performing a transmitting operation) may determine whether a channel is in a busy or idle state based on a predefined (or preconfigured) CCA threshold. When the state of the channel is the idle state, the transmitting node may transmit a signal and/or a channel in the corresponding channel. The above-described operation may be referred to as 'listen before talk (LBT) operation'. The LBT operation may be classified into four categories according to whether the LBT operation is performed and how it is applied. The first category may be a scheme in which the transmitting node does not perform the LBT operation. That is, when the first category is used, the transmitting node may transmit a signal without performing the channel sensing operation. The second category may be a scheme in which the transmitting node performs the LBT operation without a random back-off operation. The third category may be a scheme in which the transmitting node performs the LBT operation based on a random backoff value using a contention window (CW) of a fixed size. The fourth category may be a scheme in which the transmitting node performs the LBT operation based on a random backoff value using a contention window of a variable size.

The LBT operation may be performed in unit of a specific frequency bundle. The frequency bundle may be referred to as 'LBT subband'. Here, the LBT operation may include the above-described CCA operation, and may further include data transmission by the CCA operation according to a situation. The bandwidth of the LBT subband may vary depending on a spectrum regulation, a frequency band, a communication system, an operator, a manufacturer, etc. For example, in a band where Wi-Fi stations coexist, the bandwidth of the LBT subband may be 20 MHz or about 20 MHz. That is, the communication node may perform the channel sensing operation and/or the data transmission operation according to the channel sensing operation in unit of 20 MHz or about 20 MHz. For example, the LBT subband may be a set of contiguous RBs corresponding to about 20 MHz. In this case, the bandwidth of the set of contiguous RBs may not exceed 20 MHz. In the following description, an expression that the LBT subband is XL MHz may mean that the bandwidth of the LBT subband is XL MHz or about XL MHz. Unless stated otherwise, XL may be assumed to be 20. In the present specification, an RB may mean a physical resource block (PRB) constituting a bandwidth part in some cases. Alternatively, an RB may mean a common RB (CRB) or a virtual RB (VRB). In particular, when the RB is used in the sense of an RB constituting a carrier, the RB may mean a CRB constituting the carrier. In the NR communication system, the CRB may refer to an RB on a common RB grid configured to the terminal based on a 'Point A'.

In consideration of the LBT operation described above, the bandwidth of the carrier and/or bandwidth part configured to the terminal may be configured in multiples of XL. For example, the carrier and/or bandwidth part may be configured as 20, 40, 60, 80 MHz, or the like. In the following description, an expression that the bandwidth of the carrier and/or bandwidth part is X MHz may mean that the bandwidth of the carrier and/or bandwidth part is either X MHz or about X MHz. For example, the carrier and/or bandwidth part may comprise a set of contiguous RBs corresponding to about X MHz. The carrier and/or bandwidth part in the NR communication system may be defined as a set of CRBs in the common RB grid. The bandwidth part may be configured within one carrier. Alternatively, the bandwidth part may be configured in a form including frequency regions of a plurality of carriers. In the latter case, the bandwidth part may be logically associated with the plurality of carriers.

In communications of an unlicensed band, the transmitting node may occupy a channel for some time when the LBT operation is successful. In this case, a channel occupancy time or a channel occupancy interval may be referred to as 'channel occupancy time (COT)'. An expression that the transmitting node succeeds in the LBT operation may mean that the transmitting node acquires a COT. The transmitting node may transmit a signal and/or a channel using a part of the COT or the entire COT initiated by the transmitting node. In addition, the COT initiated by the transmitting node may be shared with a receiving node. The receiving node sharing the COT may not only receive a signal but also transmit a signal. As a result, the transmitting node initiating the COT may not only transmit a signal but also receive a signal within the corresponding COT. In the present specification, the 'transmitting node' may refer to a node that started or initiated a COT, i.e., initiating node, and the 'receiving node' may refer to a node that transmits and receives a signal within the corresponding COT without starting or initiating the corresponding COT.

LBT Subband Configuration

One bandwidth part may be composed of one or more LBT subbands (or 'subbands' for convenience).

FIG. 1 is a conceptual diagram illustrating configuration of LBT subbands according to exemplary embodiments of the present invention.

A case (a) of FIG. 1 shows a first exemplary embodiment of a bandwidth part configuration including a plurality of subbands, a case (b) of FIG. 1 shows a second exemplary embodiment of a bandwidth part configuration including a plurality of subbands, and a case (c) of FIG. 1 shows a third exemplary embodiment of a bandwidth part configuration including a plurality of subbands.

Referring to the cases (a) to (c) of FIG. 1, one bandwidth part may be composed of four LBT subbands, and each LBT subband may have a bandwidth of 20 MHz. That is, XL=20. Since a transmitting node, that is, a base station or a terminal performs CCA on an LBT subband basis before transmitting a signal, a channel corresponding to a part of the bandwidth part or the entire bandwidth part may be occupied by the communication node, and used for signal transmission according to a channel sensing result.

For example, referring to the case (a) of FIG. 1, the transmitting node may succeed in the LBT operations in all LBT subbands of the bandwidth part at a certain time point, and transmit signals using the entire band of the bandwidth part. For another example, referring to the case (b) of FIG.

1, the transmitting node may succeed in the LBT operations in some LBT subbands of the bandwidth part, that is, the first, third, and fourth subbands at a certain time point, and transmit signals in the corresponding subbands. For yet another example, referring to the case (c) of FIG. 1, the transmitting node may succeed in the LBT operations in some LBT subbands of the bandwidth part, that is, the first, second, and third subbands at a certain time point, and transmit signals in the corresponding subbands. In the following description, the success of the LBT operation by the communication node may mean that the channel is determined to be in idle state as a result of performing the CCA. On the other hand, the failure of the LBT operation by the communication node may mean that the channel is determined to be occupied by another node as a result of performing the CCA.

In an unlicensed band, one or a plurality of LBT subband(s) may be activated to the terminal. The LBT subband(s) may belong to the same carrier or the same bandwidth part, or may belong to different carriers or different bandwidth parts. One or a plurality of carriers may be activated to the terminal, one or a plurality of bandwidth parts may be activated in each activated carrier, and each activated bandwidth part belonging to the unlicensed band may be composed of one or a plurality of LBT subband(s). Alternatively, each activated carrier may be composed of one or a plurality of LBT subband(s). In the following description, the case where one carrier or one active bandwidth part is composed of one or a plurality of LBT subband(s) will be mainly considered. However, proposed methods are not limited thereto, and may be easily applied to the case where a plurality of LBT subband(s) belongs to a plurality of carriers or a plurality of active bandwidth parts.

Meanwhile, a guard band may be inserted between the LBT subbands constituting the carrier or bandwidth part. This may be referred to as an 'in-carrier (intra-carrier) guard band' to distinguish it from an inter-carrier guard band. The transmitting node may ensure a normal channel sensing operation in an unoccupied LBT subband by transmitting a signal in a frequency region excluding the guard band in the occupied LBT subband. For example, referring to the case (b) of FIG. 1, in order to ensure a normal channel sensing operation in the second subband, guard bands may be inserted into the first and third subbands, and the transmitting node may not transmit signals in the guard bands, so that interferences caused to the second subband can be minimized. In addition, referring to the case (c) of FIG. 1, in order to ensure a normal channel sensing operation in the fourth subband, a guard band may be inserted into the third subband, and the transmitting node may not transmit a signal in the guard band, so that interferences caused to the fourth subband can be minimized.

FIG. 2 is a conceptual diagram illustrating configuration of LBT subbands according to other exemplary embodiments of the present invention.

A case (a) of FIG. 2 shows a fourth exemplary embodiment of configuration of a bandwidth part including a plurality of subbands, and a case (b) of FIG. 2 shows a fifth exemplary embodiment of configuration of a bandwidth part including a plurality of subbands.

Referring to the cases (a) and (b) of FIG. 2, the bandwidth part may be composed of four LBT subbands. In the exemplary embodiment of the case (a) of FIG. 2, the bandwidth part may not include guard bands between the subbands, and in the exemplary embodiment of the case (b) of FIG. 2, the bandwidth part may include guard bands between the subbands.

In the above exemplary embodiments, each subband may be composed of some RB(s) of RBs constituting the bandwidth part or carrier. In the following description, the expression that a subband constitutes a bandwidth part or is composed of PRB(s) constituting a bandwidth part may be interpreted in the same meaning as that the subband constitutes the carrier or is composed of CRB(s) constituting the carrier. In the following description, the number of RBs constituting the bandwidth part or carrier is denoted by NB, and the number of LBT subbands constituting the bandwidth part or carrier is denoted by K. In this case, when the number of RBs constituting the k-th subband is NS(k) (k=1, 2, . . . , K), NS(k) may be a natural number less than or equal to NB. In an exemplary embodiment, NS(k) may have the same value for all k. Alternatively, in another exemplary embodiment, NS(k) may have values independent of each other with respect to k. The RB(s) constituting each subband may be continuous in the frequency domain.

When the LBT subband or subband is composed of RB(s) by the above-described method, the term 'LBT subband' or 'subband' may be replaced with more general terms such as 'RB set', 'PRB set', 'CRB set', etc.

An upper limit of NS(k) may be predefined in the technical specification. In one example, the upper limit of NS(k) may be the number of RBs corresponding to (or smaller than, in consideration of the guard bands) a bandwidth of one channel, which is a unit of executing the LBT operation. In another example, a maximum value of the bandwidth of the subband is defined, and the bandwidth of the subband may be limited such that the bandwidth of the subband determined by NS(k) does not exceed (or is less than) the defined maximum value of the bandwidth of the subband. Similarly, a lower limit of NS(k) may be predefined in the technical specification. In one example, the lower limit of NS(k) may also be the number of RBs corresponding to (or smaller than, in consideration of the guard bands) a bandwidth of one channel, which is a unit of executing the LBT operation. In another example, a minimum value of the bandwidth of the subband is defined, and the bandwidth of the subband may be limited such that the bandwidth of the subband determined by NS(k) is not less than (or greater than) the defined minimum value of the bandwidth of the subband. The maximum value and/or minimum value of the bandwidth of the subband need not necessarily be an integer multiple of the bandwidth of one RB, and may be an arbitrary positive number. Alternatively, NS(k) may be predefined in the technical specification. That is, the bandwidth of each subband may consist of a fixed number of RB(s). This may correspond to a case where the upper limit value and the lower limit value of NS(k) are the same. Alternatively, the base station may configure the bandwidth part or carrier, the subband, the guard band, etc. so that each subband in the bandwidth part or carrier is included in a frequency range (excluding the guard bands) of each predefined channel. The above-described values, upper limit value, and/or lower limit value of NS(k), and maximum value and/or minimum value of the bandwidth of the subband may be differently defined for each numerology (e.g., subcarrier spacing). In addition, these values may be defined differently for each frequency band.

Similarly, each guard band may be composed of some RB(s) of RBs constituting the bandwidth part or carrier. When the number of LBT subbands constituting the bandwidth part or carrier is K, the number of guard bands may be (K−1). In this case, when the number of RBs constituting the g-th guard band is NG(g) (g=1, 2, . . . , K−1), NG(g) may be an integer equal to or greater than 0 and equal to or less than NB. In an exemplary embodiment, NG(g) may have the same value for all g. Alternatively, in another exemplary embodiment, NG(g) may have values independent of each other with respect to g. The RB(s) constituting each guard band may be continuous in the frequency domain.

An upper limit of NG(g) may be predefined in the technical specification. Alternatively, a maximum value of the bandwidth of the guard band is defined, and the bandwidth of the guard band may be limited such that the bandwidth of the guard band determined by NG(g) does not exceed (or is less than) the defined maximum value of the bandwidth of the guard band. Alternatively, a lower limit of NG(g) may be predefined in the technical specification. Alternatively, a minimum value of the bandwidth of the guard band is defined, and the bandwidth of the guard band may be limited such that the bandwidth of the guard band determined by NG(g) is not less than (or greater than) the defined minimum value of the bandwidth of the guard band. The maximum and/or minimum value of the bandwidth of the guard band may be represented by the number of RBs. Alternatively, the maximum value and/or minimum value of the bandwidth of the guard band need not necessarily be an integer multiple of the bandwidth of one RB and may be an arbitrary positive number. Alternatively, NG(g) may be predefined in the technical specification. That is, the bandwidth of each guard band may consist of a fixed number of RB(s). This may correspond to a case where the upper limit value and the lower limit value of the NG(g) are the same. The predefined NG(g) value may be used as a default value of the bandwidth of the guard band. That is, when the terminal does not receive information on the size of the guard band from the base station, the terminal may construct the guard bands using the predefined NG(g) value. Alternatively, the base station may configure the bandwidth part or carrier, the subband, the guard band, etc. so that each guard band in the bandwidth part or carrier includes a frequency range of each guard band predefined between adjacent channels. The above-described values, upper limit value, and/or lower limit value of NG(g), and maximum value and/or minimum value of the bandwidth of the guard band may be defined differently for each numerology (e.g., subcarrier spacing). In addition, these values may be defined differently for each frequency band.

In the above exemplary embodiments, a union of the RBs constituting the LBT subband(s) and guard band(s) may be the same as the set of RBs constituting the carrier. That is, all RBs of the carrier or bandwidth part may belong to at least one LBT subband or guard band. At the same time or separately, the RB sets constituting each LBT subband and guard band may be disjoint sets (i.e., the intersection thereof may be a null set). That is, a certain RB in the carrier or bandwidth part may belong to only one LBT subband or belong to only one guard band. That is, a starting RB of the first subband may be a starting RB of the carrier and an ending RB of the first subband may be an RB having an index one lower than an index of a starting RB of the first guard band. A starting RB of the k-th subband (k=2, . . . , K−1) may be an RB having an index one higher than an index of an ending RB of the (k−1)-th guard band, and an ending RB of the k-th subband may be an RB having an index one lower than an index of a starting RB of the k-th guard band. A starting RB of the K-th subband may be an RB having an index one higher than an index of an ending RB of the (K−1)-th guard band, and an ending RB of the K-th subband may be an ending RB of the carrier.

Alternatively, the LBT subbands and the guard bands may have an intersection with each other. That is, a certain RB may belong to a plurality of LBT subbands. Alternatively, a certain RB may belong to both of the LBT subband and the guard band.

As described above, some or all of information on composition of subbands in the bandwidth part or carrier (i.e., the number of LBT subbands constituting the bandwidth part or carrier, a set of RB(s) constituting each LBT subband, a set of RB(s) constituting each guard band) may be predefined for each 'channel' to which a frequency band and the bandwidth part are allocated. For example, in case of the subcarrier spacing of 30 kHz and 15 kHz, a bandwidth occupied by one LBT subband having a bandwidth of 20 MHz in a certain band may be defined to correspond to 51 and 106 consecutive PRBs, respectively, and may be shared in advance between the base station and the terminal. That is, NS(k)=51 and NS(k)=106 for all k in the band.

Alternatively, the base station may signal part or all of the information on the configuration of the subbands in the bandwidth part or carrier to the terminal. In the above examples, a frequency position of each LBT subband (e.g., a starting RB index of the LBT subband) may be predefined for each channel or signaled from the base station to the terminal. For another example, information on the number of LBT subbands constituting the bandwidth part or carrier, information on a set of RB(s) constituting each LBT subband, and/or information on a set of RB(s) constituting each guard band may be signaled from the base station to the terminal. In some cases, the information on the set of RB(s) constituting each LBT subband and the information on the set of RB(s) constituting each guard band may be mutually interchangeable. In this case, one of the two pieces of information may be signaled to the terminal. The information on the set of RB(s) constituting the LBT subband or guard band may be represented by a starting RB index and an ending RB index constituting the LBT subband or guard band. Alternatively, the information on the set of RB(s) may be represented by a starting RB index and the number of the RBs.

In the following description, unless otherwise indicated, 'signaling' may refer to physical layer signaling (e.g., downlink control information (DCI)), MAC signaling (e.g., MAC control element (CE)), RRC signaling (e.g., a master information block (MIB), a system information block (SIB), cell-specific RRC signaling, terminal-specific RRC signaling, etc), and the like. The 'signaling' may mean a combination of two or more of the physical layer signaling, the MAC signaling, and the RRC signaling. In addition, in the following description, unless otherwise indicated, 'signaling (or configuration)' may mean both signaling (or configuration) by an explicit scheme and signaling (or configuration) by an implicit scheme. For example, the information on configuration of the subbands in the bandwidth part or the carrier may be configured to the terminal by RRC signaling, and may be configured together with bandwidth part configuration information or carrier configuration information. The information on the configuration of the subbands in the bandwidth part or carrier may be configured differently for each bandwidth part or each carrier. The values of NB, NS(k), and/or NG (g) may be different for each bandwidth part or carrier, or for each subcarrier spacing applied to the bandwidth part or carrier. The information on the composition of the LBT subbands may be applied only to a bandwidth part that is configured terminal-specifically. For an uplink and/or downlink initial active bandwidth part, K=1.

The initial active bandwidth part may be informed by the base station to the terminal through transmission of an SS/PBCH block. For example, the terminal may succeed in detecting an SS/PBCH block, and acquire a downlink initial active bandwidth part from a frequency position of the SS/PBCH block. When there are a plurality of bandwidths and/or frequency positions that the downlink initial active bandwidth part can have, at least part of information on the frequency position of the downlink initial active bandwidth part may be included in control information (e.g., MIB) transmitted through a PBCH. For example, the base station may signal a frequency region of a CORESET #0 (i.e., CORESET with ID=0) to the terminal through the PBCH, and the terminal may regard the frequency region of the CORESET #0 as the downlink initial active bandwidth part. In this case, the number of PRBs constituting the downlink initial active bandwidth part may be a multiple of 6. Alternatively, the base station may explicitly signal the frequency region of the downlink initial active bandwidth part to the terminal through the PBCH. In this case, the downlink initial active bandwidth part may have a smaller bandwidth than the bandwidth of one LBT subband described above. Alternatively, the downlink initial active bandwidth part may have a bandwidth corresponding to the bandwidth of one LBT subband described above. The initial active bandwidth part may also be composed of PRB(s) consecutive in the frequency domain.

Meanwhile, the initial active bandwidth part may be configured to the terminal in two stages. For example, as described above, the base station may signal the frequency region of the CORESET #0 to the terminal through the PBCH, the terminal may regard the frequency region of the CORESET #0 as the downlink initial active bandwidth part (hereinafter, 'first downlink initial active bandwidth part'). Alternatively, the base station may explicitly signal the frequency region of the first downlink initial active bandwidth part to the terminal through the PBCH. In addition, the terminal may be configured a downlink initial active bandwidth part (hereinafter, 'second downlink initial active bandwidth part') through system information (e.g., SIB1). For example, the second downlink initial active bandwidth part may be configured to have a bandwidth corresponding to the bandwidth of one LBT subband described above. In this case, the terminal may regard the second downlink initial active bandwidth part as valid, and the configuration by the PBCH may be limited so as only to mean the frequency region of the CORESET #0.

When an unlicensed band carrier is configured to the terminal as a secondary cell (SCell), an initial active bandwidth part of the unlicensed band carrier may be configured from the base station to the terminal. For example, the base station may signal information on the initial active bandwidth part of the unlicensed band carrier to the terminal through a primary cell (PCell) or a primary secondary cell (PSCell). The signaling may be RRC signaling.

The initial active bandwidth part may be composed of a plurality of LBT subbands. As described above, when the initial active bandwidth part is configured to the terminal in two stages, the initial active bandwidth part (e.g., the second downlink initial active bandwidth part) configured in the second stage may be composed of one or a plurality of LBT subbands. In addition, the initial active bandwidth part of the unlicensed band carrier configured to the terminal as the secondary cell may be composed of one or a plurality of LBT subbands. A method for the plurality of LBT subbands to constitute the initial active bandwidth part may follow the method described above. In this case, the base station may configure configuration information on the subbands and/or guard bands of the initial active bandwidth part to the terminal. The information may be configured to the terminal together with configuration information of the initial active bandwidth part (e.g., through system information or SIB1, or through RRC signaling). The initial active bandwidth part may include a downlink initial active bandwidth part and an uplink initial active bandwidth part.

Hereinafter, when the LBT subband(s) and/or guard band(s) are configured in the carrier, a method of applying the configuration of the LBT subband(s) and/or guard band(s) to the bandwidth part configured in the carrier will be described.

Figure 3:
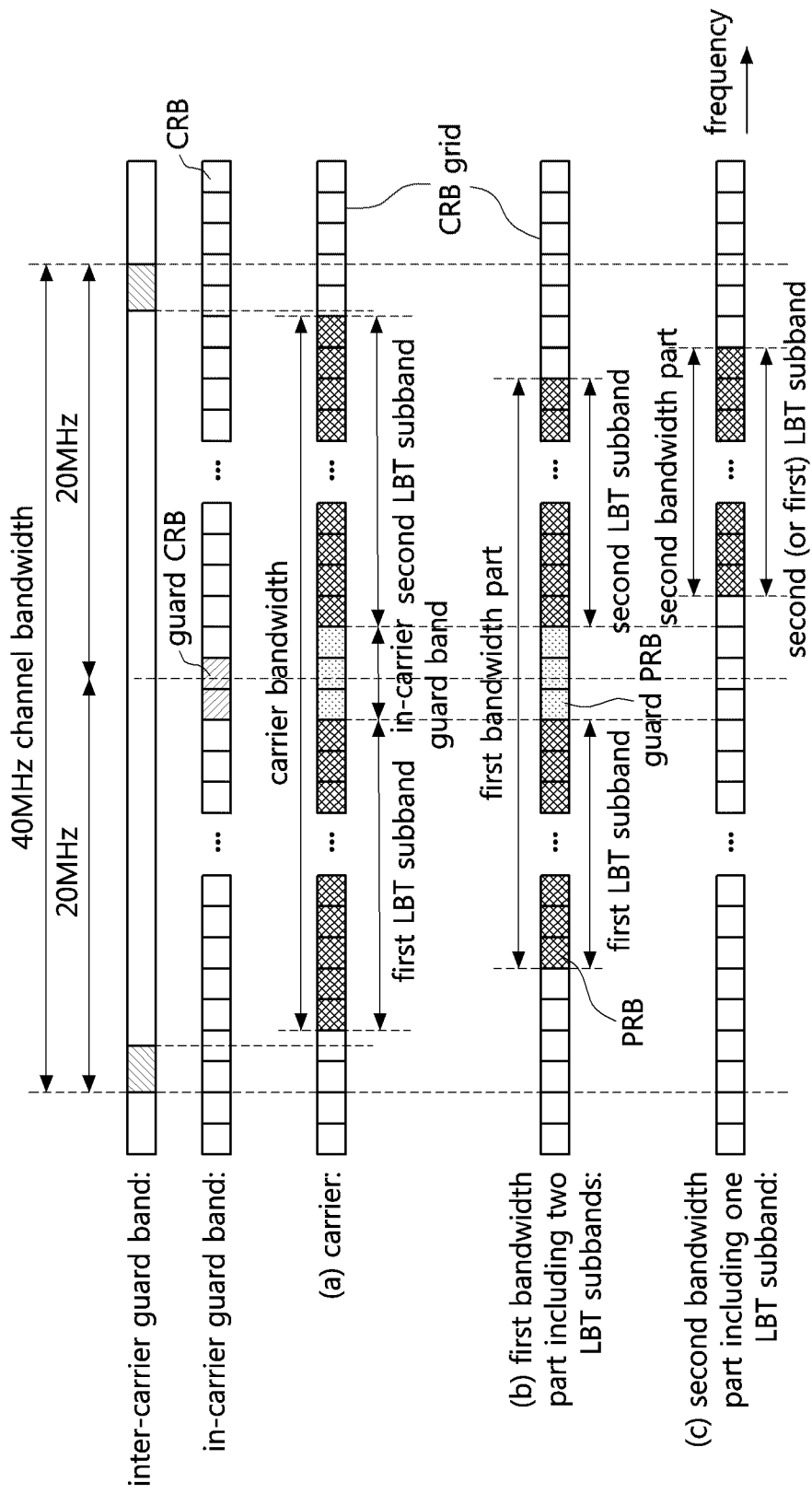
FIG. 3 is a conceptual diagram illustrating configuration of a carrier and LBT subbands in an unlicensed band according to exemplary embodiments of the present invention.

FIG. 3 is a conceptual diagram illustrating configuration of a carrier and LBT subbands in an unlicensed band according to exemplary embodiments of the present invention.

A case (a) of FIG. 3 shows a first exemplary embodiment of configuration of a carrier and LBT subbands in an unlicensed band, a case (b) of FIG. 3 shows a first exemplary embodiment of a method of applying an LBT subband configured in a carrier to a bandwidth part, and a case (c) of FIG. 3 shows a second exemplary embodiment of a method of applying an LBT subband configured in a carrier to a bandwidth part.

Referring to the case (a) of FIG. 3, a carrier may be configured within a channel bandwidth of 40 MHz. The carrier may be composed of consecutive RBs and may be configured in a region excluding inter-carrier guard bands defined at both frequency ends of the 40 MHz channel. In this case, in order to satisfy the occupied channel bandwidth (OCB) requirement, a minimum bandwidth value (in units of Hz) or a minimum number of RBs of the carrier may be defined. The minimum bandwidth value or the minimum number of RBs of the carrier may be defined for each frequency band, each country or region, each channel bandwidth size, and/or each subcarrier spacing. The carrier may also include in-carrier guard bands. The in-carrier guard band may be defined to have an integer number of CRB(s) on a CRB grid, and according to the present exemplary embodiment, two CRBs may constitute the guard band. The size and/or frequency position of the guard band may be predefined and shared between the base station and the terminal.

The carrier may also include two LBT subbands and one guard band. These may be configured from the base station to the terminal in the above-described manner. The first and second subbands may be the same or different in size. The guard band may be configured as three consecutive RBs and may include the two predefined CRBs. In general, the guard band (e.g., the three RBs) configured by the base station to the terminal may include a predefined guard band (e.g., the two CRBs). Alternatively, the guard band configured by the base station to the terminal may include a predefined guard band when the size thereof is not 0 (e.g., when one or more RBs are included).

Referring to the cases (b) and (c) of FIG. 3, a bandwidth part may be configured in the carrier. Referring to the case (b) of FIG. 3, the first bandwidth part may be composed of a part of the RBs constituting the carrier, and may include at least part of the first and second subbands and the guard band(s). The first and second subbands of the first bandwidth part may be composed of RBs configured as the first and second subbands in an associated carrier, respectively. In addition, the guard band of the first bandwidth part may be composed of RBs (i.e., three RBs) configured as the guard band in the associated carrier. Referring to the case (c) of FIG. 3, the second bandwidth part may be composed of a part of the RBs constituting the carrier and may include at least a part of the second subband. The second subband of the second bandwidth part may be composed of RBs configured as the second subband in the associated carrier. The second subband may be considered as a first subband or a subband having a first index (e.g., index 0) within the second bandwidth part. Alternatively, when the bandwidth part includes only one subband, it may be considered that no subband is configured in the corresponding bandwidth part. In this manner, an LBT subband(s) and/or guard band(s) may be configured in the carrier, and they may be applied to a bandwidth part configured in the carrier so as to be considered for signal transmission in the bandwidth part. According to the present exemplary embodiments, each guard band in the bandwidth part may exist only between two subbands. That is, a starting PRB and an ending PRB of the bandwidth part may not be configured as guard bands.

In the above-described method, the initial active bandwidth part may include only one LBT subband. That is, the initial active bandwidth part may be composed of RBs belonging to the same LBT subband in the carrier associated with the initial active bandwidth part. In addition, the initial active bandwidth part may not include an in-carrier guard band. The base station may appropriately configure the LBT subband and/or guard band in the carrier to satisfy the above condition. For example, the second bandwidth part of the case (c) of FIG. 3 may be the initial active bandwidth part belonging to the carrier of the case (a) of FIG. 3. Here, the initial active bandwidth part may refer to a downlink and/or uplink initial active bandwidth part, and may also refer to the first and/or second downlink initial active bandwidth part.

Also in an unlicensed band, frequency ranges of downlink and uplink bandwidth parts may be configured differently. In this case, the above-described method may be applied to the downlink bandwidth part and the uplink bandwidth part, respectively. For example, the first bandwidth part of the case (b) of FIG. 3 may be a downlink bandwidth part, and the second bandwidth part of the case (c) of FIG. 3 may be an uplink bandwidth part.

Also in an unlicensed band, configuration of an LBT subband may be unnecessary in some cases. For example, when the bandwidth of the carrier or bandwidth part is small (e.g., 20 MHz or less in the 5 GHz band), configuration of an LBT subband may be unnecessary. Alternatively, operations on an LBT subband basis may be unnecessary in a frequency band where a heterogeneous radio access technology (RAT) terminal (e.g., Wi-Fi terminal) does not coexist. In consideration of this, the method of configuring an LBT subband and/or guard band may be selectively applied depending on the situation.

The base station may dynamically indicate the terminal of LBT subband(s) available for transmission among the LBT subband(s) configured in the carrier or bandwidth part. The available LBT subband(s) may be determined by a result of the LBT operation performed by the base station. For example, the base station may select some or all of LBT subband(s) belonging to a channel occupied by an LBT operation as the available LBT subband(s), and indicate the selected subbands to the terminal. Information on the available LBT subband(s) may be transmitted through physical layer signaling. For example, it may be transmitted on a PDCCH as included in DCI. The PDCCH may be a group common PDCCH, and the terminal may monitor and receive it in a CSS set (e.g., type 3 PDCCH CSS set). The information on the available LBT subband(s) may be represented by a bitmap. Each bit of the bitmap may indicate availability of each LBT subband, and the LBT subband(s) participating in the dynamic availability indication may be configured to the terminal through higher layer signaling (e.g., RRC signaling). For example, when four LBT subbands are configured in the carrier or bandwidth part, the base station may configure three of these LBT subbands to the terminal through RRC signaling, and dynamically indicate a 3-bit bitmap corresponding thereto to inform whether each subband is available or not. One bitmap may correspond to LBT subband(s) for one or a plurality of carriers. When the terminal is indicated that a certain LBT subband is available by the above-described method, the terminal may perform PDCCH monitoring, signal transmission, etc. under assumption that the LBT subband is available during a time period predefined or agreed with the base station (e.g., until the end of the COT or transmission burst to which the received DCI belongs).

Meanwhile, an LBT subband and a guard band may overlap in the frequency domain. That is, a part of the RBs constituting the LBT subband may be configured as the guard band (or guard RB).

Figure 4:
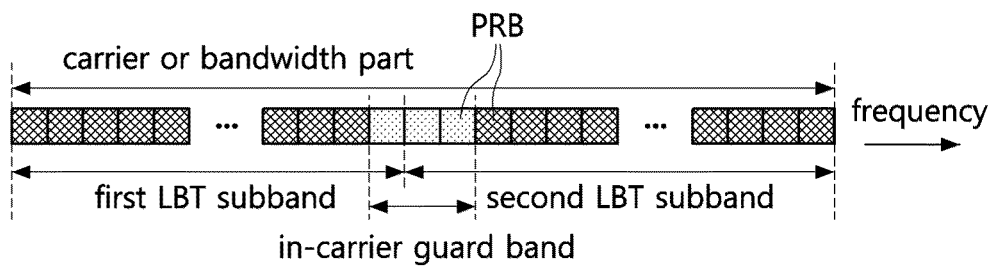
FIG. 4 is a conceptual diagram illustrating configuration of a carrier and LBT subbands in an unlicensed band according to other exemplary embodiments of the present invention.

FIG. 4 is a conceptual diagram illustrating configuration of a carrier and LBT subbands in an unlicensed band according to other exemplary embodiments of the present invention.

Referring to FIG. 4, two LBT subbands may be configured in a carrier or a bandwidth part. The first and second subbands may be configured to be adjacent to each other, and a union of RBs constituting the first and second subbands may be the same as a set of RBs constituting the carrier or bandwidth part. That is, each RB in the carrier or bandwidth part may belong to at least one subband. Also, RB sets respectively constituting the first and second subbands may be disjoint sets. That is, each RB in the carrier or bandwidth part may belong to at most one subband. When the above two conditions are met simultaneously, a frequency range (i.e., size and position) of each LBT subband may be represented only by a position of a boundary between the LBT subbands (e.g., the last RB index of the first subband or the first RB index of the second subband), which may be signaled to the terminal from the base station.

In addition, referring to FIG. 4, the last RB of the first subband and the first two RBs of the second subband may be configured as an in-carrier guard band. Frequency ranges of the guard band and the LBT subbands may be configured independently. Alternatively, the RB(s) constituting the guard band may be configured to the terminal, and the terminal may find out to which LBT subband each guard RB belongs through a predetermined rule. For example, assuming that the number of guard RBs constituting the guard band is G (G is a natural number), the G guard RBs may belong to an adjacent subband of a lower (or higher) frequency. Applying the above-described rule to the exemplary embodiment of FIG. 4, three guard RBs may belong to the first (or second) subband. For another example, first ceil(G/2) (or floor(G/2)) guard RBs may belong to a lower frequency adjacent subband, and last floor(G/2) (or ceil(G/2)) guard RBs may belong to a higher frequency adjacent subband. Applying the above-described rule to the exemplary embodiment of FIG. 4, the first two (or one) RBs of the three guard RBs may belong to the first subband and the last one (or two) RBs of the three guard RBs may belong to the second subband. Alternatively, the terminal may know to which LBT subband each guard RB belongs through configuration from the base station. An index of the guard RB may be configured to the terminal in form of an RB offset from a specific RB index (e.g., a specific RB indicating a subband boundary corresponding to the guard RB).

When the above-described method is applied, the terminal or the base station may transmit a signal using the remaining RBs excluding the guard RB(s) in each LBT subband in a period in which the guard band is deactivated. On the other hand, the terminal or the base station may transmit a signal using the RBs including the guard RB(s) in each LBT subband in a period in which the guard band is activated. That is, a first RB set may be composed of RBs excluding the guard RB(s) and a second RB set may be composed of RBs including the guard RB(s). In addition, according to the above-described method, a frequency range of each LBT subband may be invariant regardless of whether the guard band is activated or not (e.g., until reconfigured through RRC signaling). Activation and deactivation of the guard band will be described later.

Signal Transmission Method in a Guard Band

Within one bandwidth part, when all LBT operations for LBT subbands adjacent to a certain guard band are successful and the corresponding LBT subbands are occupied (and used for transmission) by a transmitting node and/or a receiving node, the guard band may be used for signal transmission. In the same sense, the guard band may be activated in this case.

For example, referring to the case (b) of FIG. 2, when the base station succeeds in the LBT operations in the first and second subbands and simultaneously occupy the first and second subbands, the base station and/or the terminal may transmit a signal by using not only the first and second subbands but also the first guard band. On the other hand, when the base station fails in the LBT operation in any one of the first and second subbands, the first guard band may not be used for signal transmission. In the same sense, in this case, the first guard band may be deactivated. This method may be referred to as 'Method 001'. By Method 001, whether to allow signal transmission in the guard band may be dynamically changed depending on the outcomes of the LBT operations. In this case, whether the LBT subbands adjacent to a certain guard band are occupied or not and/or whether a signal is transmitted through the guard band or not may be signaled from the base station to the terminal, or from the terminal to the base station. For example, the base station may explicitly or implicitly indicate a set of subband(s) occupied and used for downlink transmission by the base station to the terminal through a PDCCH, a group common PDCCH, a DM-RS, etc. The terminal may identify whether the LBT subbands adjacent to the guard band are occupied through the signaling, and determine whether to transmit a signal in the guard band according to the above-described condition.

Alternatively, whether the guard band is used may be signaled from the base station to the terminal. This method may be referred to as 'Method 002'. For example, whether resource allocation of a data channel (e.g., PDSCH or PUSCH) includes a guard band may be signaled from the base station to the terminal. For example, the above-described information may be included in DCI (e.g., DCI including scheduling information of the PDSCH or PUSCH) and may be dynamically indicated to the terminal. In this case, the guard band(s) whose use(s) are indicated may be a part or all of the guard band(s) constituting the bandwidth part. For example, only whether or not to use the guard band(s) between the subbands occupied by the base station may be indicated from the base station to the terminal. Similarly, information on a set of the subband(s) occupied by the base station may be signaled from the base station to the terminal.

As described above, there may be two types of sets consisting of PRB(s) constituting the bandwidth part. The first PRB set is a set composed of all the PRB(s) constituting the bandwidth part. According to the above-described method, a cardinality of the first PRB set may be NB. The second PRB set may be a set composed of PRB(s) excluding PRB(s) belonging to the above-described guard bands among the PRB(s) constituting the bandwidth part. According to the above-described method, a cardinality of the second PRB set may be (NB-NG(1)-NG(2)- . . . -NG(K−1)). Here, NB may be regarded as the number of PRBs constituting the bandwidth part (not the number of RBs constituting the carrier), K may be regarded as the number of LBT subbands constituting the bandwidth part (not the carrier), and NG(g) may be regarded as the number of PRBs constituting the g-th guard band in the bandwidth part (not the number of RBs constituting the g-th guard band in the carrier).

In this case, the first PRB set or the second PRB set may be used for transmission of each signal and channel transmitted by a node. In an example, the first PRB set may be used for transmission of a data channel (e.g., PDSCH, PUSCH). That is, a data channel may be allocated to a part or all of the PRBs constituting the first PRB set, and the part or all of the PRBs may include the PRB(s) constituting the guard band. When the first PRB set is used for transmission of a signal or channel, as described above, the PRB(s) constituting the guard band may be used for transmission only when a certain condition is satisfied. In another example, a frequency resource region of a CORESET may be allocated in the PRB(s) constituting the second PRB set. That is, the remaining PRB(s) excluding the PRB(s) constituting the guard band may be used for transmission of a PDCCH. In yet another example, the first PRB set may be used for transmission of a synchronization signal, reference signal, etc. for measurement of channel state information (CSI), radio resource management (RRM), radio link monitoring (RLM), beam quality, and the like. The synchronization signal may include a primary synchronization signal (PSS), a secondary synchronization signal (SSS), and the like, and the reference signal may include a channel state information reference signal (CSI-RS), a sounding reference signal (SRS), and the like.

Meanwhile, in Method 001 or Method 002, when LBT operations for LBT subbands adjacent to a certain guard band are all successful and the corresponding LBT subbands are occupied (and used for transmission) by a transmitting node and/or a receiving node, the guard band may be activated in the entire duration of the time period (e.g., COT or downlink transmission burst period) for which the adjacent LBT subbands are occupied. On the other hand, in this case, the guard band may be partially activated (or partially deactivated) in a part of the time period (e.g., COT or downlink transmission burst period) for which the adjacent LBT subbands are occupied. The latter exemplary embodiment will be described with reference to FIG. 5.

Figure 5:
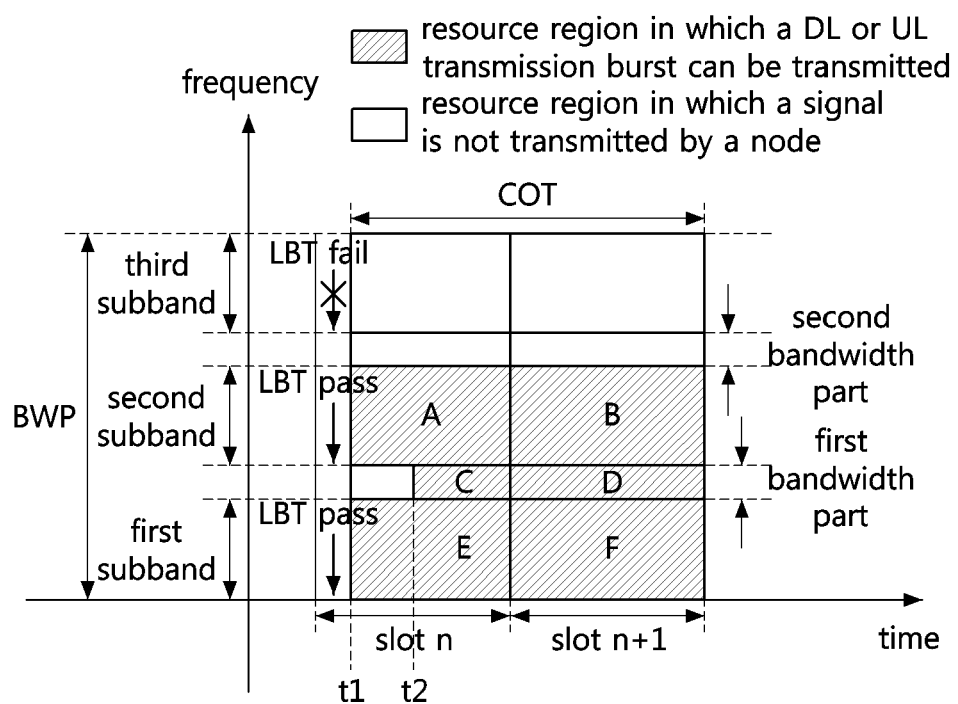
FIG. 5 is a conceptual diagram illustrating an exemplary embodiment of a method of activating a guard band in a bandwidth part composed of a plurality of LBT subbands.

FIG. 5 is a conceptual diagram illustrating an exemplary embodiment of a method of activating a guard band in a bandwidth part composed of a plurality of LBT subbands.

Referring to FIG. 5, one bandwidth part may be composed of three LBT subbands, that is, the first, second, and third subbands. In addition, guard bands may be arranged between adjacent LBT subbands. The first guard band may be disposed between the first and second subbands, and the second guard band may be disposed between the second and third subbands. In the present exemplary embodiment, the bandwidth part shown in FIG. 5 may be a downlink bandwidth part or an uplink bandwidth part. In the former case, a transmitting node or a node initiating a COT may be a base station, and in the latter case, a transmitting node or a node initiating a COT may be a terminal. Referring back to FIG. 5, the base station or the terminal may succeed in the LBT operations in the first and second subbands just before a time point t1, and transmit a downlink or uplink transmission burst in the first and second subbands from the time point t1.

According to the guard band activation condition of Method 001 or the signaling of Method 002, within the transmission burst period or in a COT corresponding thereto, the first guard band may be activated and used for signal transmission. In addition, the second guard band may be deactivated and not used for signal transmission. In addition, according to the above-described method, the first guard band may be partially activated in a part of the COT. Referring to FIG. 5, the first guard band may be deactivated from the time point t1 to a time point t2, and may be activated from the time point t2. The first guard band may also be activated until the end of the COT or transmission burst. That is, the activated guard band may be deactivated at the end of the COT or transmission burst. In this case, each of the time points t1 and t2 may mean a starting time point of a specific symbol or a boundary between specific symbols.

As a result, a certain physical signal and/or channel may be transmitted in a resource region where resource regions A, B, C, D, E, and F are combined within the COT or transmission burst. For example, the terminal may expect that a data channel (e.g., PDSCH, PUSCH, DM-RS for decoding thereof) is allocated within the resource region. Also, a reference signal (e.g., CSI-RS, SRS, etc.), a control channel (e.g., CORESET, PUCCH resource, etc.), a reserved resource, etc. may be configured and transmitted in the resource region. Alternatively, the reference signal, the control channel, etc. may be transmitted in the remaining resource region excluding the resource regions C and D, that is, the resource region in which the resource regions A, B, E, and F are combined. This may correspond to the second PRB set described above in the frequency domain. The terminal may rate-match a PDSCH or PUSCH around the reserved resource assuming that no PDSCH or PUSCH is transmitted in the reserved resource.

The time point when the guard band is activated within the COT, that is, the time point t2 may be signaled from the base station to the terminal or from the terminal to the base station. For example, when the COT is a COT initiated by the base station, the base station may explicitly or implicitly signal the time point t2 to the terminal through a PDCCH, a group common PDCCH, a DM-RS, or the like. A set of downlink signals used for transmission of information on the time point t2 may be used as an initial signal for downlink transmission burst detection of the terminal. When the set of downlink signals used for transmission of the information on the time point t2 includes a group common PDCCH, the group common PDCCH may include slot format information, COT related information, and a set of subband(s) occupied in the COT, etc. in addition to the information on the time point t2. In case of the NR, the group common PDCCH may correspond to a DCI format 2_0 or a new DCI format to which the DCI format 2_0 is modified. The base station may inform the terminal of the time point t2 at least at the beginning of the COT or the downlink transmission burst (e.g., a part or all of first A symbol(s) of the COT).

Alternatively, the time point t2 may be configured semi-statically from the base station to the terminal. For example, the time point t2 may be configured to the terminal through RRC signaling (e.g., system information, cell-specific RRC signaling, or terminal-specific RRC signaling). Alternatively, the time point t2 may be predefined in the technical specification. The time point t2 may be defined using a time offset (e.g., B symbol(s), C slot(s), etc.) from a certain reference time point (e.g., the starting time point of the COT or transmission burst, i.e., the time point t1), or may be configured or indicated from the base station to the terminal or from the terminal to the base station. The C slot(s) may comprise a partial slot. For example, the first slot among the C slot(s) from the time point t1 may be a full slot or a partial slot depending on the position of the time point t1. That is, the time point t2 may be defined, configured, or indicated as a starting time point of the (C+1)-th slot among the slot(s) constituting the COT or transmission burst. According to an exemplary embodiment, C=1. That is, the time point t2 may be a starting time point of the second slot among the slot(s) constituting the COT or transmission burst. Applying this to the first exemplary embodiment of FIG. 5, the time point t2 may be a starting time point of the slot (n+1).

The minimum time offset that the terminal can support may be defined as capability of the terminal. Alternatively, factor(s) causing the time offset (e.g., digital/analog transmission bandwidth adjustment time, digital/analog filtering change time, etc.) may be defined as the capability of the terminal. In this case, the base station may appropriately configure the time point at which the guard band is activated based on the capability information of the terminal. A plurality of terminals may have different capabilities regarding the time offset, and the capability information may be transmitted from the terminal to the base station. For example, the capability information may be defined as an RRC message. In addition, the time offset may be different for each numerology (e.g., subcarrier spacing) or may be different for each frequency band. Two or more of the above-described methods may be used together.

The time point t2 may be defined or configured for each LBT category used for channel acquisition. For example, when a COT or transmission burst is initiated by the first category LBT operation, the base station and the terminal may know in advance a set of LBT subband(s) occupied by the COT or transmission burst, and guard bands may be activated at an earlier time point than in the case of the second to fourth category LBT operations. For example, the guard bands may be activated from the starting time point of the COT or transmission burst. Applying this to the first exemplary embodiment of FIG. 5, the time point t2 and the time point t1 may coincide.

Based on the time point when the guard band is activated within the COT or transmission burst, a previous duration may be referred to as 'D1' and a subsequent duration may be referred to as 'D2'. For example, D1 may be the duration from the time point t1 to the time point t2. For example, the second PRB set may be used for signal transmission in D1, and the first PRB set may be used for signal transmission in D2. In this case, one data channel (e.g., PDSCH or PUSCH) allocated to the terminal may belong to only one of D1 and D2.

Figure 6:
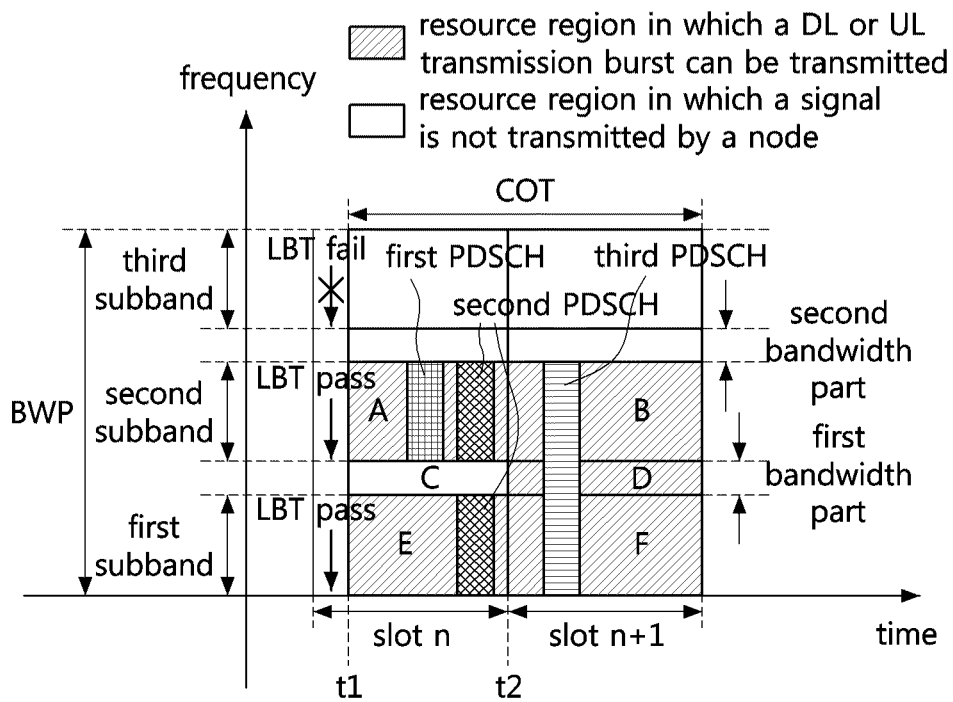
FIG. 6 is a conceptual diagram illustrating another exemplary embodiment of a method of activating a guard band in a bandwidth part composed of a plurality of LBT subbands.

FIG. 6 is a conceptual diagram illustrating another exemplary embodiment of a method of activating a guard band in a bandwidth part composed of a plurality of LBT subbands.

The exemplary embodiment of FIG. 6 is the same as the exemplary embodiment of FIG. 5 except the activation time point of the first guard band. That is, referring to FIG. 6, the activation time point of the first guard band, that is, the time point t2 may be the starting time point of the slot (n+1). In addition, D1 may be the duration from the time point t1 to the time point t2, and D2 may be the duration from the time point t2 to the ending time point of the COT, that is, the entire duration of the slot (n+1). As described above, data channels, that is, first, second, and third PDSCHs, may be allocated to the resource region where the resource regions A, B, D, E, and F are combined. In this case, by the above-described method, each PDSCH may belong to only one of D1 and D2. That is, the first and second PDSCHs may belong only to D1, and the third PDSCH may belong only to D2. The terminal may not expect any data channel to be allocated to belong to both D1 and D2. Alternatively, the terminal may regard the above case (i.e., the case when a data channel is allocated to belong to both D1 and D2) as an error, and may not transmit or receive the allocated data channel.

The terminal may assume that the first PRB set or the second PRB set is used for resource allocation of a data channel in D1 and D2. For example, the terminal may assume that a PDSCH or PUSCH is allocated within the second PRB set in D1, and thus may interpret frequency domain resource allocation information according to the assumption. In addition, the terminal may assume that a PDSCH or PUSCH is allocated within the first PRB set in D2, and thus may interpret frequency domain resource allocation information according to the assumption. For example, the terminal may interpret a frequency domain resource allocation field of DCI based on PRB indexing within the first or second PRB set.

The above-described method may be applied both in case of scheduling by a dynamic grant and in case of a configured grant or semi-persistent scheduling. Alternatively, the above-described method may be applied to a data channel (e.g., PDSCH, PUSCH) scheduled by a dynamic grant or DCI. A CRC applied to the dynamic grant or DCI may be scrambled by a C-RNTI, MCS-C-RNTI, second C-RNTI, or the like. In addition, the CRC applied to the dynamic grant or DCI may be scrambled by a CS-RNTI. The latter case may correspond to initial transmission and retransmission of a PDSCH by a type 2 configured grant or by semi-persistent scheduling. On the other hand, unlike the dynamic scheduling, since resource allocation by the configured grant or semi-persistent scheduling is semi-statically and periodically repeated, it may be difficult to ensure that one data channel always belongs to only one of D1 and D2. Thus, a data channel allocated by a configured grant or semi-persistent scheduling may belong to both D1 and D2. In this case, the terminal may not transmit or receive the data channel. In addition, the terminal may not transmit or expect to receive a hybrid automatic repeat request acknowledgment (HARQ-ACK) corresponding to the data channel.

Alternatively, when a resource region of a data channel belongs to both D1 and D2, the data channel may be transmitted. In this case, when a DM-RS for decoding of the data channel is mapped to symbol(s) belonging to D1, the DM-RS may not be mapped to the guard band. That is, the DM-RS may be mapped only within the second PRB set. Therefore, channel estimation for the guard band may be difficult through the DM-RS. In order to solve this problem, when a data channel is transmitted through a resource region belonging to both D1 and D2, the DM-RS may be mapped to symbol(s) belonging to D2. For example, when a type 2 mapping is used for a PDSCH or PUSCH, the DM-RS for decoding thereof may be mapped to the earliest symbol(s) among the symbol(s) belonging to D2. In this case, when a CORESET is configured in the earliest symbol(s) in D2, the DM-RS for decoding the PDSCH may be mapped to symbol(s) after the symbol(s) to which the CORESET is mapped. As another method to enable channel estimation of the guard band, an additional DM-RS may be transmitted for decoding the data channel. For example, the DM-RS mapped to the beginning part of the data channel may be mapped only to the second PRB set in D1, and the additional DM-RS may be mapped to the first PRB set including the guard bands in D2.

When a data channel is repeatedly transmitted or when slot aggregation is applied, a plurality of transmission instances constituting repeated transmissions of the data channel may be allocated to different durations. For example, when a PDSCH is transmitted twice, the first PDSCH instance may belong to D1 and the second PDSCH instance may belong to D2. In this case, frequency domain resource allocation of the first instance may be equally applied to other instance(s) except for the first instance. That is, when the first instance is placed in D1, the remaining instance(s) may not be allocated to the guard band. In order to solve this problem, a data channel may be allocated in the first PRB set even in D1. That is, nominal resource allocation of a data channel may include the guard PRB regardless of the time duration, and when a data channel is allocated in the resource region including the guard PRB(s) in D1, the terminal may transmit or receive the data channel in a region excluding the guard PRB(s). The terminal may puncture the data channel with respect to the guard PRB(s), and may not map the data channel to the guard PRB(s). Alternatively, the terminal may rate-match the data channel around the guard PRB(s).

According to the above-described method, a PRB set available for resource allocation of the data channel may be dynamically changed. For example, the second PRB set may be used at the beginning part of the COT or transmission burst, and the first PRB set may be used after a specific time point. Alternatively, a PRB set valid for resource allocation of the data channel may be dynamically indicated to the terminal. For example, information on the available PRB set may be included in DCI scheduling the data channel and frequency domain resource allocation of the data channel may be performed on the available PRB set indicated by the DCI. For example, information of a frequency domain resource allocation field of the PDSCH or PUSCH may be interpreted based on PRB indexing of the available PRB set indicated by the same DCI. The base station may indicate the first PRB set or the second PRB set as the available PRB set. The field of the DCI for this may consist of 1 bit. Alternatively, the information on the available PRB set may be transmitted to the terminal using at least a part of a DCI field defined for another purpose.

In the above-described method, in addition to the first and second PRB sets, another PRB set may be indicated as the available PRB set. Each PRB set may include one or more LBT subbands and zero or more guard bands. Each PRB set may be configured to the terminal through higher layer signaling (e.g., RRC signaling). In this case, the size of the DCI field for indicating the available PRB set may be determined by the number of (candidate) PRB sets configured through higher layer signaling.

On the other hand, when frequency hopping between slots or frequency hopping between transmission instances is applied to a data channel, at least part of the remaining instance(s) may be mapped to a frequency region including the guard band. Alternatively, the terminal may expect that all transmission instances constituting repeated transmissions of the data channel are always scheduled to belong to only one of D1 and D2.

The above-described proposed method may be applied to other physical signals and channels in addition to the data channel. For example, only one of D1 and D2 may be used for each transmission of a signal and a channel (e.g., aperiodic CSI-RS, aperiodic SRS, etc.) that are dynamically indicated to the terminal.

Meanwhile, a method of dynamically changing a frequency range of an LBT subband according to whether a guard band is activated may be considered.

Figure 7:
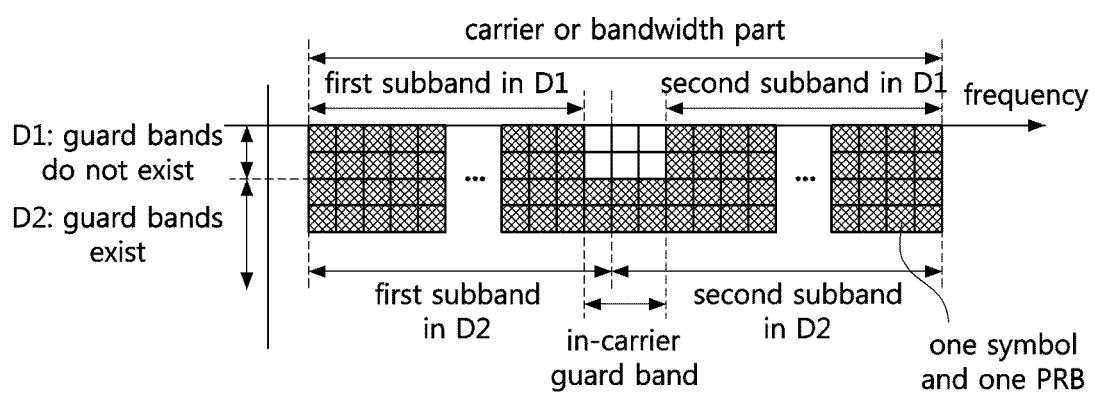
FIG. 7 is a conceptual diagram illustrating yet another exemplary embodiment of a method of activating a guard band in a bandwidth part composed of a plurality of LBT subbands.

FIG. 7 is a conceptual diagram illustrating yet another exemplary embodiment of a method of activating a guard band in a bandwidth part composed of a plurality of LBT subbands.

Referring to FIG. 7, two LBT subbands may be configured in a carrier or a bandwidth part. In addition, a guard band may be configured in the carrier or the bandwidth part. The guard band may be activated at a certain time point and may be used for signal transmission. In this case, frequency ranges of the LBT subbands may be changed based on a time point at which the guard band is activated or deactivated. That is, the ranges of the LBT subbands of D1 and D2 may be different. For example, as shown in FIG. 7, the LBT subband in D1 may have a range that does not include the guard band or the guard PRB. On the other hand, the LBT subband in D2 may have a range including the guard band or the guard PRB. The ranges of the LBT subbands of D1 and D2 may be configured separately. Alternatively, the range of the LBT subband in one duration may be configured, and the range of the LBT subband in another duration may be derived therefrom. An LBT subband and a duration in which each guard PRB is included may be determined by a predetermined rule or by configuration from the base station.

According to the LBT subband configuration method proposed by the present invention, the base station may appropriately configure the LBT subbands and/or the guard bands between the LBT subbands according to the situation. For example, the base station may configure the subbands and/or guard bands such that each subband constituting the bandwidth part corresponds to each channel of the corresponding frequency band. For example, in a 5 GHz unlicensed band, each channel may be channelized such that it has a 20 MHz bandwidth, in which case the base station may configure a bandwidth part for the terminal such that each subband in the bandwidth part belongs to each 20 MHz channel. For another example, the base station may configure a guard band between the subbands in the bandwidth part and control interferences between the subbands. On the other hand, the base station may not configure the guard band to the terminal (e.g., the number of PRBs of the guard band is set to 0), and the base station and/or the terminal may control the interferences between the subbands by appropriately applying a waveform generation scheme, a modulation scheme, and the like.

Meanwhile, in the above exemplary embodiments, the expression that a data channel is not mapped to an in-carrier guard band (e.g., the guard PRB(s)) may mean that the data channel is rate-matched around the in-carrier guard band (e.g., the guard PRB(s)). That is, in some cases, an operation of mapping a data channel to a resource region excluding a specific resource (e.g., PRB(s)) may be equivalent to an operation of rate-matching the data channel around the resource region excluding the specific resource (e.g., PRB(s)). The some cases may include a case where the data channel is a PUSCH. Specifically, when a PUSCH is mapped and transmitted on one or a plurality of interlace(s) in one or a plurality of LBT subband(s), according to the proposed method, the terminal may transmit the PUSCH in PRBs excluding the guard PRB(s) among the PRBs constituting the interlace(s). This may mean that the terminal transmits the PUSCH by rate-matching the PUSCH around the guard PRB(s). In this case, resource allocation information of the PUSCH may include one or a plurality of LBT subbands or index(es) thereof and one or a plurality of LBT subband(s) or index(es) thereof, which are configured or indicated from the base station to the terminal.

In addition, in the above exemplary embodiments, the in-carrier guard band may mean a reserved resource. For example, when the in-carrier guard band is composed of one or a plurality of PRB(s), the terminal may be configured the PRB(s) from the base station as the reserved resource. The terminal may transmit the PUSCH by rate-matching the PUSCH around the reserved resource (when the resource region of the PUSCH includes the reserved resource configured by the base station), and the base station may receive the PUSCH assuming that the PUSCH is rate-matched by avoiding the reserved resource. That is, the terminal may transmit the PUSCH by mapping the PUSCH to the resource region of the PUSCH except for the reserved resource. Accordingly, the reserved resource may mean a resource region in which transmission of a PUSCH (or PDSCH) is unavailable. The terminal may transmit the PUSCH in the resource region excluding the guard PRB(s) by being configured the guard PRB(s) as the reserved resource from the base station and rate-matching and mapping the PUSCH (or PDSCH) around the reserved resource.

The reserved resource may generally be configured as a combination of one or a plurality of PRB(s) in the frequency domain and/or one or a plurality of symbol(s) (or one or a plurality of slot(s)) in the time domain. When the frequency domain information is configured to be omitted, the reserved resource may include all PRBs (e.g., all PRBs in the bandwidth part) in the frequency domain. When the time domain information is configured to be omitted, the reserved resource may include all symbols in the time domain. When an in-carrier guard band of an unlicensed band is to be configured as the reserved resource, only frequency domain information, that is, information indicating a PRB set corresponding to the guard band may be configured.

The terminal may be semi-statically configured the reserved resource, and may always or semi-statically rate-match the PUSCH (or PDSCH) around the reserved resource. A higher layer signaling procedure (e.g., RRC signaling) may be used for this. For example, an in-carrier guard PRB of an unlicensed band may be configured as a semi-static reserved resource. In this case, the base station and the terminal may not transmit a data channel in the guard PRB in any interval within the COT. This may lead to a decrease in spectral efficiency.

On the other hand, the terminal may be dynamically indicated by the base station whether to rate-match the data channel around the configured reserved resource. A physical layer signaling procedure (e.g., DCI signaling) may be used for this. Specifically, one or a plurality of reserved resource groups may be configured, and whether or not to perform rate matching on each group may be indicated to the terminal through a field value of scheduling DCI. One reserved resource group may include one or a plurality of reserved resource configurations. In case of a PUSCH by a dynamic grant, the terminal may be indicated whether or not to rate-match the PUSCH around the reserved resource (e.g., the guard PRB(s)) by the above-described method. In this case, the base station may allocate the PUSCH to a resource region excluding the guard PRB by instructing the terminal to rate-match the PUSCH around the guard PRB in D1, and allocate the PUSCH in a resource region including the guard PRB by instructing the terminal not to rate-match the PUSCH around the guard PRB in D2.

On the other hand, in case of a PUSCH by a configured grant, the terminal may not receive an uplink grant corresponding to the PUSCH. Scheduling information of the PUSCH may be configured through RRC signaling or indicated through a previously transmitted DCI. In this case, it may be difficult to indicate the above-described operation in D1 and D2 through a rate matching field of the DCI. That is, it may be difficult for the terminal to be dynamically indicated by the base station whether to map the PUSCH by including the reserved resource (e.g., guard PRB(s)) or not.

In a proposed method, a time domain resource region of the reserved resource may be defined or configured based on a specific time point within a COT or a transmission burst (e.g., downlink or an uplink transmission burst). For example, the time domain resource region of the reserved resource may be determined as a predetermined time interval from a starting time point of the COT or transmission burst. The predetermined time interval may consist of one or a plurality of symbol(s) or one or a plurality of slot(s). In the latter case, the first slot may be a partial slot. For example, the predetermined time interval may be an interval from the starting time point of the COT or transmission burst to the X-th appearing slot boundary (X is a natural number). The predetermined time interval may be predefined in the technical specification or configured by the base station to the terminal. For example, X=1, X=2, etc. may be defined in the technical specification, or a value of X may be configured to the terminal. The predetermined time interval may correspond to D1. In this case, the reserved resource may be configured by semi-static signaling.

According to the above-described method, the in-carrier guard PRB may be configured as a frequency resource of the reserved resource, and a time resource of the reserved resource may be defined or configured as a certain time from the starting time point of the COT or transmission burst. The reserved resource may be considered as a semi-static reserved resource. That is, the terminal may always or semi-statically rate-match a PUSCH (or PDSCH) around the reserved resource, and transmit the PUSCH (or PDSCH). Even so, since the reserved resource exists only up to a certain time point (e.g., D1) within the COT or transmission burst, it may be possible that the terminal maps the data channel to the guard PRB from thereafter (e.g., D2).

In another proposed method, the terminal may determine whether to rate-match the PUSCH around the reserved resource, and transmit information on whether the terminal rate-matches the PUSCH around the reserved resource to the base station together with the corresponding PUSCH. The PUSCH may be a PUSCH by a configured grant. The information on whether the rate-matching is performed may be piggybacked and transmitted on a PUSCH as uplink control information (UCI). The UCI may be referred to as configured grant (CG)-UCI for convenience. Specifically, the CG-UCI may be transmitted as being mapped to a part of the resource region or the entire resource region of the PUSCH, and channel coding may be applied separately from the PUSCH. The CG-UCI may be mapped to symbol(s) excluding symbols to which a DM-RS for decoding of the PUSCH is mapped. The reserved resource may be configured by the base station semi-statically (e.g., through RRC signaling). Information on whether the terminal rate-matches the PUSCH around the reserved resource may be represented by 1 bit. Meanwhile, the reserved resource group(s) may be configured to the terminal, and whether the terminal performs rate-matching may be indicated to the base station in units of the reserved resource group. For example, when two reserved resource groups are configured to the terminal, information on whether the terminal rate-matches the PUSCH around each reserved resource group may be represented by 1 bit, respectively, and a total of 2 bits may be transmitted to the base station.

According to the above-described method, the in-carrier guard PRB may be semi-statically configured as a reserved resource, and the terminal may dynamically transmit to the base station information on whether a PUSCH is rate-matched around the reserved resource together with the PUSCH. For example, the terminal may rate-match the PUSCH around the in-carrier guard PRB in D1, and transmit information on the rate-matching to the base station together with the PUSCH. In addition, the terminal may not rate-match the PUSCH around the in-carrier guard PRB in D2 (i.e., may map the PUSCH to the region including the guard PRB), and transmit the information to the base station together with the PUSCH. The base station may receive the information (e.g., UCI) on whether or not the rate-matching is performed, identify the resource region to which the PUSCH is mapped through the information, and perform a reception operation of the PUSCH based on the identified resource region.

In another proposed method, when the PUSCH is allocated to contiguous LBT subbands, the terminal may assume that no guard band or guard PRB exists between the contiguous LBT subbands. That is, the terminal may use all PRBs belonging to the LBT subbands for PUSCH transmission. In this case, there is no frequency gap between the LBT subbands and the LBT subbands may be adjacent to each other.

RE-Mapping of Data Channel

According to the method described above, one guard band may be defined or configured between two adjacent LBT subbands in one bandwidth part. Meanwhile, a method in which two guard bands are defined or configured between two adjacent LBT subbands for efficient RE-mapping of a data channel (e.g., PDSCH, PUSCH, PSSCH, etc.) may be considered.

Figure 8:
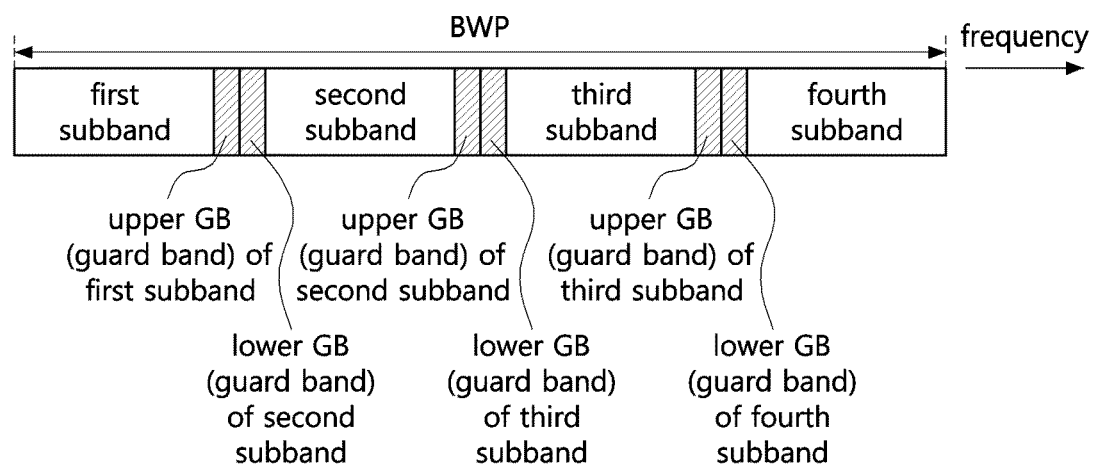
FIG. 8 is a conceptual diagram illustrating configuration of LBT subbands according to yet another exemplary embodiment of the present invention.

FIG. 8 is a conceptual diagram illustrating configuration of LBT subbands according to yet another exemplary embodiment of the present invention.

Referring to FIG. 8, one bandwidth part may be composed of four subbands, and two guard bands may be inserted between respective two adjacent subbands. Each of the two guard bands may correspond to one of the two adjacent subbands. For example, guard bands (e.g., a lower guard band and an upper guard band) corresponding to the respective subbands may exist at both ends of a bandwidth of each subband. Exceptionally, guard bands may not be inserted at both ends of the bandwidth part. For example, in the exemplary embodiment of FIG. 8, the lower guard band of the first subband and the upper guard band of the fourth subband may not be defined or configured.

Similarly, each guard band may be composed of some PRB(s) of the PRBs constituting the bandwidth part. According to the above-described method, when the number of LBT subbands constituting the bandwidth part is K, the number of guard bands may be (2*K−2). The guard bands may be configured to have sizes independent of each other. Alternatively, some or all of the guard bands may be configured with the same size, that is, the same number of PRB(s). Some guard bands may be zero in size. The number of PRBs constituting each guard band may be signaled to the terminal by the above-described method. The sizes of two adjacent guard bands and their signaling may be associated with each other.

In addition, even in the exemplary embodiment of FIG. 8, the guard band may be used for signal transmission by the above-described method. In addition, the guard band activation and deactivation methods described above may be equally applied. For example, a pair of adjacent guard bands may be simultaneously activated or deactivated at a time point by the conditions or signaling described above.

Meanwhile, one data channel may be allocated to a plurality of LBT subbands within one bandwidth part. In this case, when a transmitting node fails the LBT operations in some subband(s), the data channel may be punctured in the subband(s) that failed the LBT operation and transmitted only in the remaining subband(s) that succeeded in the LBT operation. Code block group (CBG) based transmission may be used for transmission robust to such the puncturing in unit of a subband. One CBG may consist of one or a plurality of code blocks (CBs), and the data channel may include one or a plurality of CBG(s). A receiving node may receive a data channel and perform a CRC check for each CBG, and feed back an HARQ-ACK to the transmitting node on a CBG basis. The transmitting node may receive the HARQ-ACK for each CBG, and increase transmission efficiency by retransmitting only CBG(s) for which the receiving node failed to receive.

Considering the uncertainty of the LBT operation described above, it may be advantageous for each CBG to be mapped to as few LBT subband(s) as possible. To this end, signals (e.g., modulated symbol sequence) constituting a data channel (e.g., PDSCH or PUSCH) may be sequentially mapped in unit of a LBT subband. That is, the symbol sequence of the PDSCH or PUSCH may be first mapped to REs of the first LBT subband in the scheduled resource region, mapped to REs of the second LBT subband, and then finally to REs of the last LBT subband. Within one subband, first, RE-mapping may be performed in ascending order for the subcarrier indexes in the frequency domain, and then RE-mapping may be performed in ascending order for the symbol indexes in the time domain. In addition, when a data channel has a plurality of transmission layers, the data channel may be RE-mapped in the order of the transmission layer domain, the frequency domain, and the time domain within one subband, giving a priority to the transmission layer domain. When the data channel includes a plurality of CBs, the symbol sequences constituting the plurality of CBs may be sequentially mapped according to the mapping rule. Whether to apply the mapping rule may be signaled from the base station to the terminal (e.g., through RRC signaling). Independent signaling procedures may be used for uplink transmission (e.g., PUSCH) and downlink transmission (e.g., PDSCH).

On the other hand, when the bandwidth part includes the guard band, the data channel may be RE-mapped to the resource region including the guard band, in which case the LBT subband and guard band may be considered in the RE-mapping of the data channel. As one method for dealing with the mapping to the guard band, each guard band may be regarded as belonging to any one subband, and the RE-mapping of the data channel may be performed according to the mapping order described above. This method may be referred to as 'Method 010'.

Figure 9:
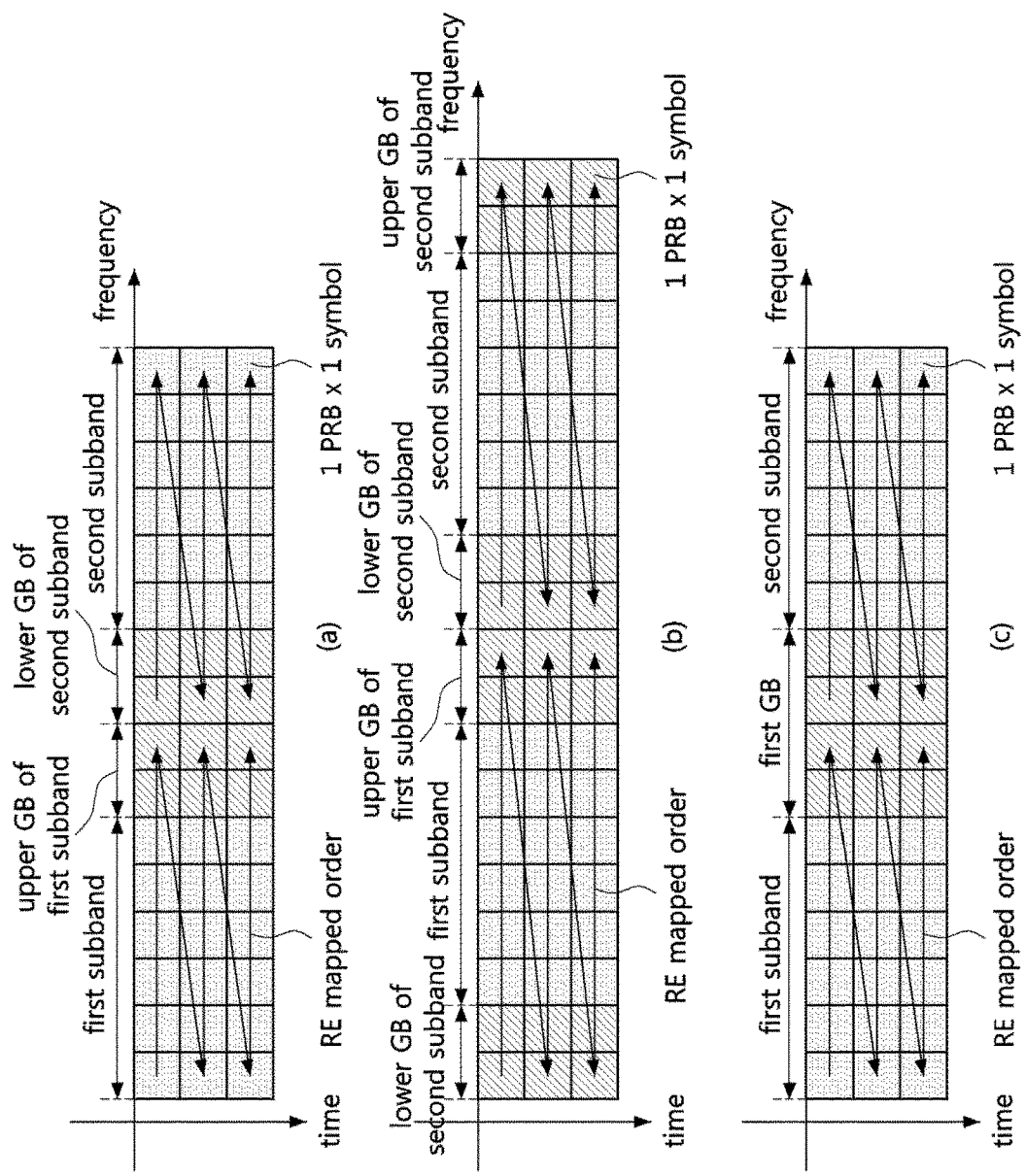
FIG. 9 is a conceptual diagram for describing exemplary embodiments of a data channel RE-mapping method in consideration of LBT subbands and guard bands.

FIG. 9 is a conceptual diagram for describing exemplary embodiments of a data channel RE-mapping method in consideration of LBT subbands and guard bands.

A case (a) of FIG. 9 shows a first exemplary embodiment of data channel RE-mapping considering LBT subbands and guard bands, a case (b) of FIG. 9 shows a second exemplary embodiment of data channel RE-mapping considering LBT subbands and guard bands, and a case (c) of FIG. 9 shows a third exemplary embodiment of data channel RE-mapping considering LBT subbands and guard bands.

Referring to the cases (a) to (c) of FIG. 9, one bandwidth part may include two LBT subbands and may include one or a plurality of guard bands. In the present exemplary embodiments, the number of transmission layers of a data channel is not taken into account. That is, it is assumed that the number of transmission layers is one.

Referring to the case (a) of FIG. 9, two guard bands may exist between subbands. The first guard band may be an upper guard band of the first subband and the second guard band may be a lower guard band of the second subband. In this case, according to Method 010, each guard band may be considered to belong to any one subband, and RE-mapping of a data channel (e.g., PDSCH or PUSCH) may be performed. For example, the upper guard band of the first subband may be considered to belong to the first subband, and the lower guard band of the second subband may be considered to belong to the second subband. Under the above-described assumption, the data channel may be RE-mapped in a predetermined order to the frequency domain, time domain, LBT subband domain, and transmission layer domain. Referring to the case (a) of FIG. 9, the data channel may be RE-mapped in the order of frequency first and time second in the first subband including the upper guard band of the first subband, and then RE-mapped in the order of frequency first and time second in the second subband including the lower guard of the second subband. As described above, the symbol sequence may be mapped to the subcarriers in ascending order in the frequency domain. However, in the drawing, this is shown in unit of a PRB.

Referring to the case (b) of FIG. 9, guard bands may exist at both ends of a bandwidth of each bandwidth part. The first and second guard bands may be the lower and upper guard bands of the first subband, respectively, and the third and fourth guard bands may be the lower and upper guard bands of the second subband, respectively. Also in this case, according to Method 010, each guard band may be considered to belong to any one subband, and RE-mapping of the data channel may be performed. For example, the lower and upper guard bands of the first subband may be considered to belong to the first subband, and the lower and upper guard bands of the second subband may be considered to belong to the second subband. Under the above-described assumption, the data channel may be RE-mapped in a predetermined order to the frequency domain, time domain, LBT subband domain, and transmission layer domain.

Referring to the case (c) of FIG. 9, one guard band may exist between subbands. Also in this case, according to Method 010, the guard band may be considered to belong to any one subband, and RE-mapping of the data channel may be performed. For example, the guard band may be considered to belong to the first subband. Under the above-described assumption, the data channel may be RE-mapped in a predetermined order to the frequency domain, time domain, LBT subband domain, and transmission layer domain. Referring to the case (c) of FIG. 9, the data channel may be first RE-mapped in the order of frequency first and time second in the first subband including the guard band, and then RE-mapped in the order of frequency first and time second in the second subband.

Meanwhile, in an unlicensed band, an interlace-based PUSCH or PUCCH resource allocation scheme may be considered. One interlace may be composed of equally spaced PRBs. For example, one interlace may consist of every tenth PRBs. Assuming that a bandwidth part is composed of 50 PRBs, 10 interlaces (e.g., interlaces 0 to 9) may be defined in the bandwidth part and each interlace may be composed of 5 PRBs. The PUSCH or PUCCH may be allocated to one or a plurality of LBT subband(s) within one bandwidth part. For example, the PUSCH may be allocated to the interlace 0 of a specific LBT subband(s) of the bandwidth part. In this case, the interlace 0 may be defined as some PRBs having equal spacing among all PRBs constituting the LBT subband(s). In addition, the PUSCH or PUCCH may be allocated to a plurality of interlaces. Information (e.g., a set of index(es)) on the LBT subband(s) and interlace(s) to which the PUSCH or PUCCH is allocated may be configured or indicated to the terminal.

Method 010 may be applied to transmission in unit of a LBT subband in addition to RE-mapping of the data channel. For example, according to Method 010, the guard band(s) may be considered to be included in the LBT subband, and an interlace may be defined for the LBT subband(s) including the guard band(s). That is, one interlace may be defined as some PRBs having equal spacing among all PRBs constituting the LBT subband(s) and guard band(s) included therein. When a PUSCH or PUCCH is allocated to an interlace including a guard band, the PUSCH or the PUCCH may be transmitted including the guard band when the guard band is activated.

DRS Candidate Resource Configuration

In the NR system, the base station may transmit a plurality of SS/PBCH blocks to support a multi-beam based initial access of the terminal. The plurality of SS/PBCH blocks may be transmitted within one SS/PBCH block transmission period, and the same beam may be applied or different beams may be applied to them. Within one SS/PBCH block transmission period, the number of SS/PBCH block candidates that can be transmitted and a time resource position of each candidate may be predefined in the technical specification for each frequency band, and the base station may actually transmit a part or all of one or more SS/PBCH block candidates. The SS/PBCH block may include at least a PSS, a SSS, a PBCH, and a DM-RS for decoding the PBCH.

Meanwhile, in an unlicensed band, an SS/PBCH block may not be transmitted in some intervals due to a failure of an LBT operation of the base station (or the terminal). Therefore, in the unlicensed band, it may be helpful to increase the number of candidate resources in which the SS/PBCH block can be transmitted. Hereinafter, a method of defining or configuring a plurality of discovery reference signal (DRS) resources in the time domain and the frequency domain and transmitting the DRS using the same will be described. In exemplary embodiments, the DRS may be configured, transmitted, and measured even in singular in the time domain (e.g., within one DRS period, within one DRS transmission window) and the frequency domain (e.g., within one carrier, within one bandwidth part, within one LBT subband). In the following exemplary embodiments, a method of configuring, transmitting, and measuring a 'plurality' of DRSs will be described for convenience of description, but the 'plurality' of DRSs (e.g., a plurality of SS/PBCH blocks) may also be interpreted as 'at least one' or 'one or more' DRSs (e.g., 'at least one' or 'one or more' SS/PBCH blocks).

In the following description, the DRS may mean a set of signals and channels for initial access, cell search, cell selection, RRM measurement and reporting, etc. of the terminal, and may include at least an SS/PBCH block. In addition, the DRS may further include a CORESET (or PDCCH search space), a PDSCH, a CSI-RS, etc. in addition to the SS/PBCH block. For example, the DRS may include resources of a CORESET #0 and a PDCCH search space set #0 or a PDCCH Type0 CSS set associated with the CORESET #0, and DCI (e.g., DCI scheduling a PDSCH including SIB1) may be transmitted through a PDCCH candidate of the search space set in the resources.

Within one DRS transmission period, a plurality of DRS candidates may be defined or configured. Each DRS candidate may correspond to each SS/PBCH block candidate. That is, each DRS candidate may include at least one SS/PBCH block candidate, and further include a CORESET (or PDCCH search space), a PDCCH, a PDSCH, a CSI-RS, etc. associated with the SS/PBCH block candidate. The CORESET (or PDCCH search space), PDCCH, PDSCH, CSI-RS, etc. constituting the DRS candidate may be mapped around a resource region to which the SS/PBCH block candidate associated therewith is mapped. For example, a signal and a channel constituting the DRS candidate, or a resource region therefor may be mapped to the same slot as the SS/PBCH block candidate associated therewith. In addition, the signal and channel constituting the DRS candidate, or the resource region therefor may be mapped to the same subband or another subband as the SS/PBCH block candidate associated therewith. The base station may actually transmit some or all of one or multiple DRS candidates. Hereinafter, the expression that base station transmits or measures a DRS or a DRS candidate may mean that the base station transmits or measures signals and/or channels (e.g., SS/PBCH block or SS/PBCH block candidate) constituting the DRS or the DRS candidate.

Figure 10:
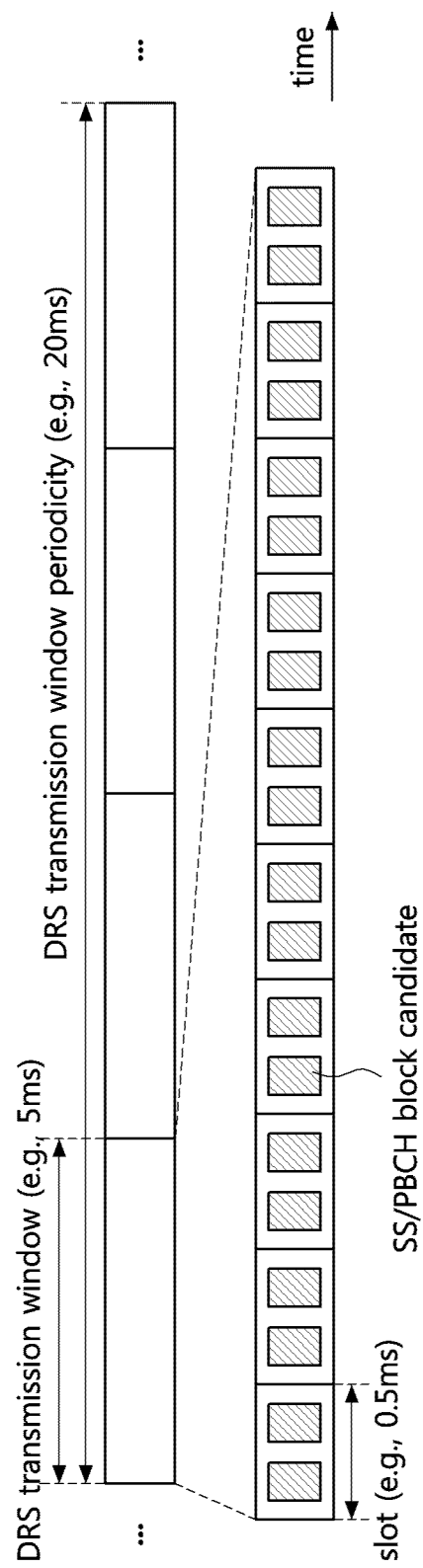
FIG. 10 is a conceptual diagram for describing an exemplary embodiment of configuring a DRS resource in a time domain.

FIG. 10 is a conceptual diagram for describing an exemplary embodiment of configuring a DRS resource in a time domain.

Referring to FIG. 10, one DRS transmission window may be composed of 10 slots, and each slot may include two DRS candidate resources (or two SS/PBCH block candidate resources). 20 DRS candidates (or 20 SS/PBCH block candidates) may be arranged within one DRS transmission window. In FIG. 10, only SS/PBCH blocks are shown among the components of the DRS for convenience. In this case, a subcarrier spacing may be 30 kHz, the length of one slot may be 0.5 ms, and the length of the DRS transmission window may be 5 ms (i.e., the length of a half radio frame). If a subcarrier spacing of 15 kHz is used, one DRS transmission window may consist of 5 slots, each slot may include two DRS candidate resources (or two SS/PBCH block candidate resources), and 10 DRS candidates (or 10 SS/PBCH block candidates) may be arranged within one DRS transmission window. The DRS transmission window may appear periodically in the time domain. For example, the periodicity of the DRS transmission window may be 20 ms or 40 ms. In addition, the periodicity of the DRS transmission window may be configured from the base station to the terminal. In some cases, the DRS transmission window may be used in the same or similar sense as an SS/PBCH block burst set. In addition, hereinafter, the periodicity of the DRS transmission window may be referred to as 'DRS periodicity' for convenience.

The base station may actually transmit a part or all of the DRS candidates according to a beam operation scheme and an LBT result. For example, when the base station occupies a channel through a second category LBT operation, the base station may transmit the DRS within a predetermined time interval, for example, up to 5% of the DRS transmission window periodicity. In addition, the time interval may not exceed 1 ms. In this case, according to the exemplary embodiment of FIG. 10, the base station may transmit up to four DRSs within one downlink transmission burst or COT.

Meanwhile, a plurality of DRS candidates may be defined or configured in the frequency domain. When one bandwidth part or carrier (hereinafter, collectively referred to as 'bandwidth part') is composed of a plurality of LBT subbands, a plurality of DRSs may be transmitted at different frequency positions within the one bandwidth part. For example, a plurality of DRS candidates within one bandwidth part may be defined or configured in different LBT subbands (or subbands corresponding to the LBT subbands). The base station may actually transmit a part or all of the plurality of DRS candidates in the plurality of LBT subbands. This method may be referred to as 'Method 100'.

Figure 11:
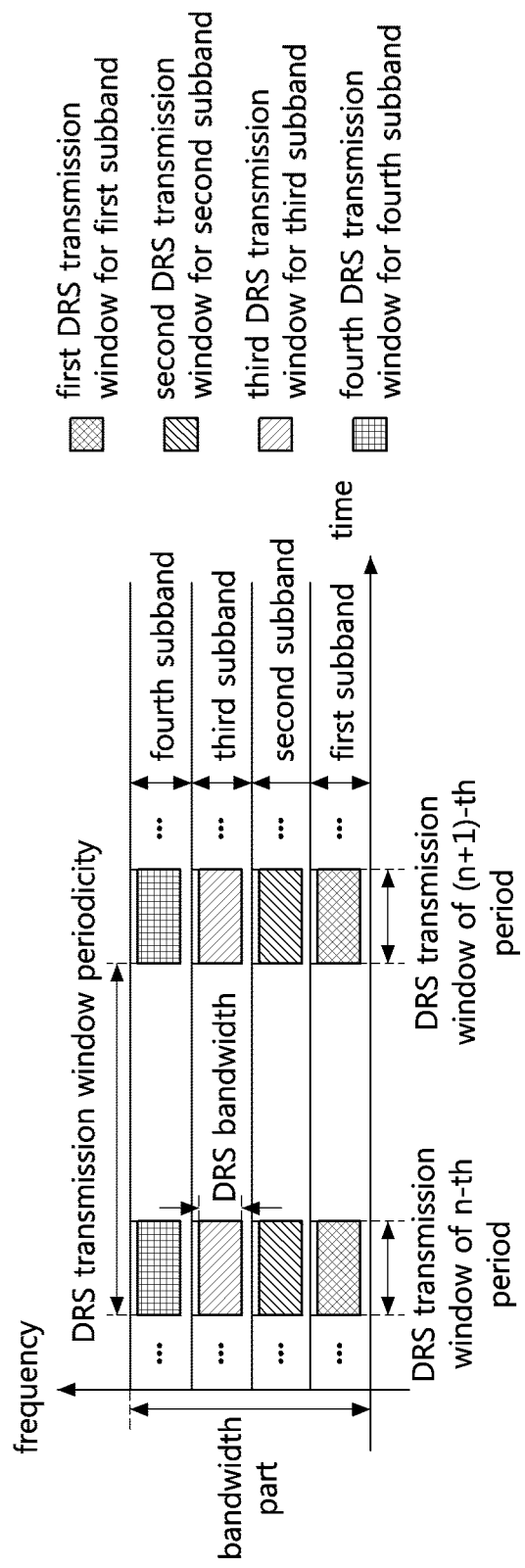
FIG. 11 is a conceptual diagram for describing a first exemplary embodiment of DRS resource configuration in a frequency and/or time domain.

FIG. 11 is a conceptual diagram for describing a first exemplary embodiment of DRS resource configuration in a frequency and/or time domain.

Referring to FIG. 11, one bandwidth part may be composed of four LBT subbands. In this case, according to Method 100, DRS candidate(s) or a resource region (e.g., DRS transmission window) including the DRS candidate(s) may be defined or configured for each LBT subband. Referring to FIG. 11, a DRS transmission window may be defined or configured for each subband, and time positions of the DRS transmission windows may be the same for all subbands. This method may be referred to as 'Method 110'. In particular, Method 110 may be used as a default operation method of a terminal performing initial access or a terminal in an RRC idle state. In the following description, when considering a plurality of DRSs in the frequency domain, the DRS transmission window may be used as a concept including both time and frequency resources. In addition, unless otherwise indicated, the bandwidth part may mean a downlink bandwidth part.

In Method 110, that the time positions of the DRS transmission windows are the same may mean that the lengths, periodicities, and starting time points or boundaries of periods of the DRS transmission windows are the same. Referring to FIG. 11, the lengths, periodicities, and starting time points of the DRS transmission windows may be the same for all LBT subbands in the bandwidth part. For example, all the DRS transmission windows may have the length of 5 ms and the periodicity of 40 ms. In this case, the common time resource configuration information may be transmitted only once in the bandwidth part unit without being repeatedly transmitted to the terminal several times for the respective subbands.

Figure 12:
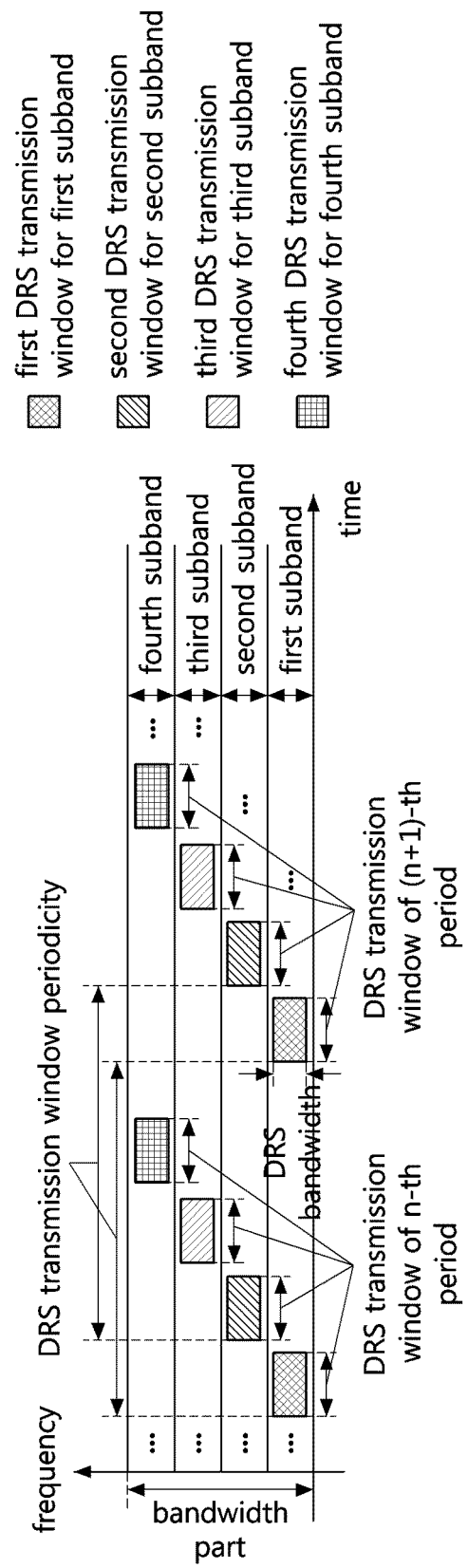
FIG. 12 is a conceptual diagram for describing a second exemplary embodiment of DRS resource configuration in a frequency and/or time domain.
Figure 13:
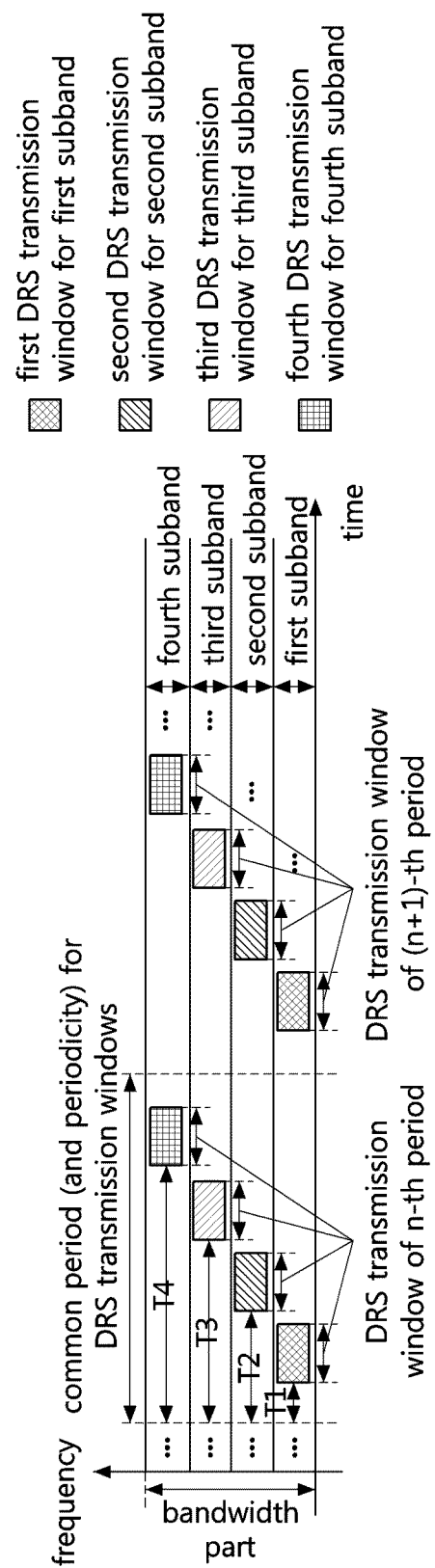
FIG. 13 is a conceptual diagram for describing a third exemplary embodiment of DRS resource configuration in a frequency and/or time domain.

FIG. 12 is a conceptual diagram for describing a second exemplary embodiment of DRS resource configuration in a frequency and/or time domain, and FIG. 13 is a conceptual diagram for describing a third exemplary embodiment of DRS resource configuration in a frequency and/or time domain.

Referring to FIGS. 12 and 13, as in the exemplary embodiment of FIG. 11, one bandwidth part may include four LBT subbands, and DRS candidate(s) or a resource region (e.g., DRS transmission window) including the DRS candidate(s) may be defined or configured for each subband. According to the present exemplary embodiments, the time position of the DRS transmission window may be different for each subband. As described above, a method in which the time position of the DRS transmission window may be different for each subband may be referred to as 'Method 120'.

In the present exemplary embodiments, the lengths of the DRS transmission windows for the respective subbands may be the same. For example, all the DRS transmission windows may have the length of 5 ms. Alternatively, the lengths of the DRS transmission windows for the respective subbands may be different. In addition, referring to the exemplary embodiment of FIG. 12, the periodicities of the DRS transmission windows for the respective subbands may be the same. However, a starting time point of each periodicity of the DRS transmission window may be different for each subband. On the other hand, referring to the exemplary embodiment of FIG. 13, the periodicities of the DRS transmission windows for the respective subbands and the starting time points of the respective periodicities may be the same. That is, a common periodicity and period may be applied to the plurality of DRS transmission windows. In this case, a time position of each DRS transmission window may be different within a common period, and the time position may be defined as a time offset value or configured to the terminal. Referring to the exemplary embodiment of FIG. 13, the time offsets for the DRS transmission windows of the first to fourth subbands may be represented by T1, T2, T3, and T4, respectively. For example, the common periodicity may be 40 ms, and the time offsets T1, T2, T3, and T4 may be 0 ms, 5 ms, 10 ms, and 15 ms, respectively. On the other hand, even when Method 120 is applied, the time positions of a part or all of the DRS transmission windows may be the same. For example, the time offsets T1, T2, T3, and T4 may all have the same value. This may correspond to the exemplary embodiment of FIG. 11. That is, in some cases, a method of configuring DRS resources by Method 110 may also be implemented by Method 120. In addition, in the above exemplary embodiments, the DRS transmission windows may be at least partially overlapped in time depending on the starting time points of the DRS transmission windows.

According to the above exemplary embodiments, at least one DRS transmission window may be configured for each LBT subband constituting the bandwidth part. On the other hand, according to another exemplary embodiment of the present invention, the DRS transmission window may be configured for each of some of the LBT subbands constituting the bandwidth part.

In the above-described methods, a plurality of DRS candidates may be arranged in the time domain within each DRS transmission window. In this case, configuration of time domain DRS resources (or DRS candidate resources) within the DRS transmission window may be equally applied to all corresponding LBT subbands. According to an exemplary embodiment, the DRS resource configuration according to the first exemplary embodiment of FIG. 10 may be equally applied to four DRS transmission windows in the exemplary embodiments of FIGS. 11 to 13.

Figure 14:
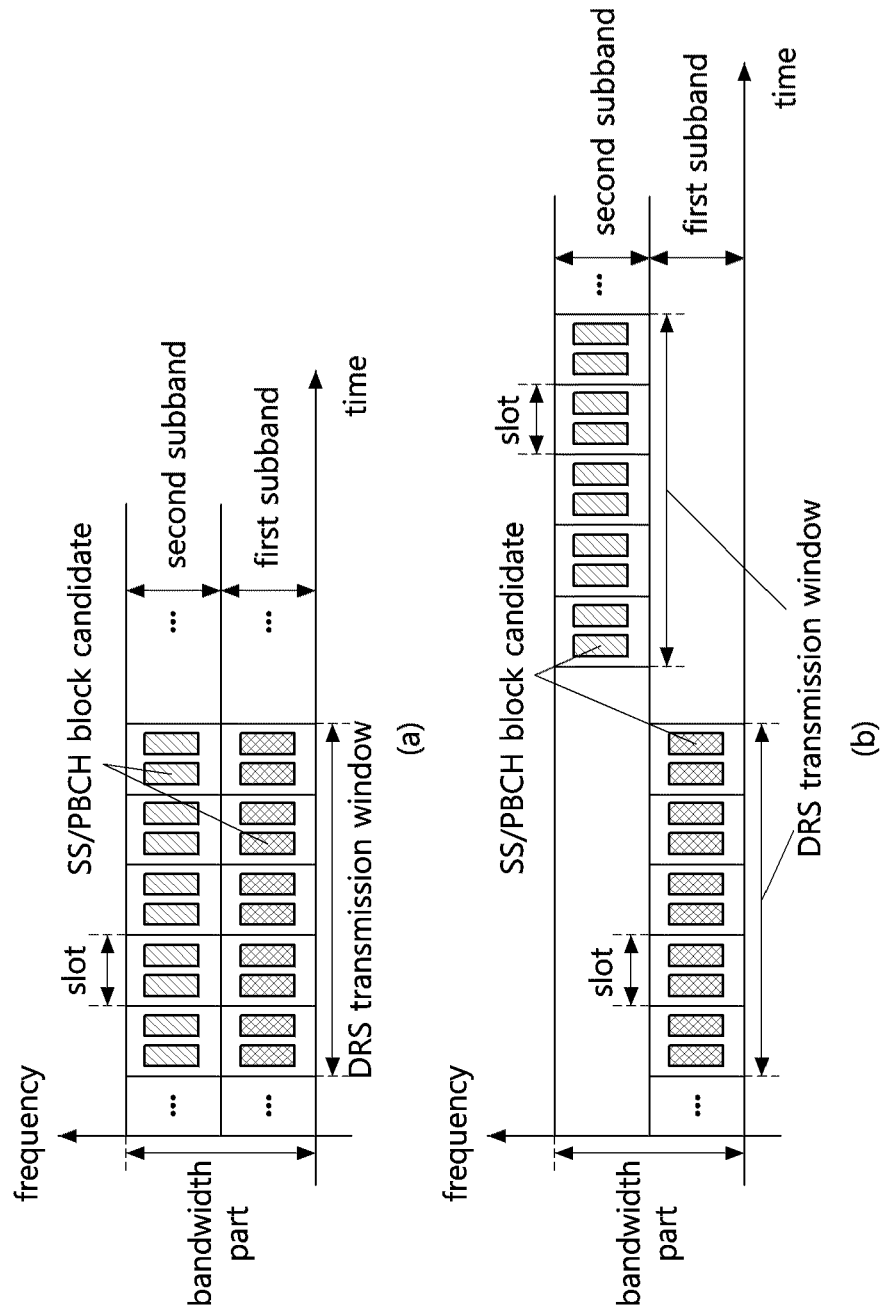
FIG. 14 is a conceptual diagram for describing a fourth exemplary embodiment of DRS resource configuration in a frequency and/or time domain.

FIG. 14 is a conceptual diagram for describing a fourth exemplary embodiment of configuring a DRS resource in a frequency and/or time domain.

According to the exemplary embodiments of FIG. 14, a plurality of DRS transmission windows may be configured in a plurality of LBT subbands constituting a bandwidth part, and each DRS transmission window may include a plurality of DRS candidates in the time domain. That is, referring to the cases (a) and (b) of FIG. 14, one bandwidth part may include two DRS transmission windows in the frequency domain, and each DRS transmission window may include 10 DRS candidates (or 10 SS/PBCH block candidates). Therefore, in this case, up to 20 DRS candidates may be configured within one DRS period in the bandwidth part.

According to the exemplary embodiment of the case (a) of FIG. 14, the DRS transmission window of the first subband and the DRS transmission window of the second subband may be aligned in the time domain. According to the exemplary embodiment of the case (b) of FIG. 14, time positions of the DRS transmission window of the first subband and the DRS transmission window of the second subband may be different from each other.

In the above-described methods, the terminal may be signaled from the base station information on the positions of the plurality of DRS resources in the frequency and/or time domain. For example, in the above-described exemplary embodiments, the terminal may be signaled by the base station information on the length and/or time position of the DRS transmission window for each subband. For example, in the exemplary embodiment of FIG. 13, the terminal may be signaled from the base station the common periodicity for the DRS transmission window(s) and a time offset of the DRS transmission window for each subband within the period. In addition, the terminal may be signaled from the base station the frequency position of the DRS resource for each subband. The frequency position of the DRS resource may be signaled to the terminal as frequency position information of a specific signal and/or channel (e.g., SS/PBCH block) constituting the DRS. For example, the terminal may acquire the frequency position information of the SS/PBCH block for each LBT subband through signaling from the base station, and the frequency position information may indicate CRB(s) or PRB(s) to which the SS/PBCH block is mapped. For example, the signaling may be cell-specific RRC signaling (e.g., SIB, SIB1, etc.). Alternatively, the signaling may be terminal-specific (UE-specific) RRC signaling.

The information on the positions of the plurality of DRS resources may help not only the terminal in the RRC connected mode but also the terminal in the RRC idle mode or the RRC inactive mode to receive the DRSs. The information on the DRS resources for the terminal may be transmitted as included in the DRS. For example, the information may be transmitted through a PBCH or MIB. Alternatively, the information may be implicitly or explicitly transmitted through another signal (e.g., PSS, SSS, and DM-RS for decoding PBCH) constituting the SS/PBCH block. Alternatively, the information may be transmitted to the terminal through a PDSCH as included in system information (e.g., SIB1). In this case, only partial information of the DRS resource positions may be transmitted in consideration of signaling overhead. For example, information on the number or set of LBT subband(s) in which the DRS can be transmitted may be transmitted through the signaling procedure described above. In this case, the terminal, in particular, the terminal in the RRC idle mode or the terminal in the RRC inactive mode may assume that the positions of the DRS time resources (e.g., the DRS transmission windows) are the same in the plurality of LBT subbands as in the exemplary embodiment of FIG. 8.

Some of the DRS resource position information may be predefined in the technical specification. For example, a default value of the DRS periodicity may be predefined in the technical specification. In addition, the terminal may acquire the DRS resource position information for at least some subbands by receiving an SS/PBCH block (e.g., in an initial access procedure). For example, the terminal may obtain a position of a half radio frame including the DRS through reception of a PBCH DM-RS and/or a PBCH in any one of the plurality of subbands constituting the bandwidth part. In this case, for example, as in the case of Method 110, when a relative distance between the DRS resources for each subband in the time domain is predetermined, the terminal may determine the time resource positions of the DRSs (e.g., DRS transmission windows) of other subband(s) based on the time resource position (e.g., position of the DRS transmission window) obtained through the above-described method. In addition, the terminal may receive the DRS resource positions of at least some LBT subbands through RRC signaling (e.g., cell-specific or terminal-specific RRC signaling). For example, for Method 120, the base station may independently configure the DRS transmission window to the terminal for each subband through RRC signaling. The information may be included in the bandwidth part configuration information or transmitted to the terminal together with the bandwidth part configuration information.

In the above-described methods, a plurality of DRSs corresponding to different LBT subbands may include the CORESET #0 and/or the search space (e.g., search space set #0) associated therewith, and configuration (e.g., resource configuration, PDCCH monitoring operation configuration, etc.) of the CORESET #0 and the search space (e.g., search space set #0) associated therewith may be the same or common for the plurality of subbands. For yet another example, configuration of SS/PBCH block(s) (i.e., index(es) of SS/PBCH block(s), time resource positions of the SS/PBCH block(s) within the DRS transmission window, etc.) that the terminal assumes as actually transmitted among the SS/PBCH block candidates may be the same or common for the plurality of subbands. The terminal may be signaled from the base station which SS/PBCH block(s) (or which DRS(s)) are actually transmitted among the plurality of SS/PBCH block candidates (or the plurality of DRS candidates). Generally, the terminal may assume that a PDSCH is not transmitted in the resource region of the corresponding SS/PBCH block(s) (or corresponding DRS(s)). That is, the terminal may receive a PDSCH by rate-matching the PDSCH around the corresponding resource region.

Alternatively, configuration of a pattern (i.e., PDSCH rate-matching pattern for the SS/PBCH block) regarding the SS/PBCH block(s) that are actually transmitted or index(es) thereof may be independent for each subband. This may provide the base station with greater flexibility with regard to the use of physical resources.

DRS Transmission

After a plurality of DRS resources or DRS candidate resources are configured in the frequency and/or time domain within one bandwidth part by the above-described method, the base station may transmit a plurality of DRSs in a plurality of frequency positions and/or a plurality of time positions within one DRS period in one bandwidth part. In addition, the terminal may receive a plurality of DRSs in a plurality of frequency positions and/or a plurality of time positions within one DRS period in one bandwidth part. For example, the base station and the terminal may transmit and receive DRSs in a plurality of LBT subbands within one DRS transmission window periodicity (e.g., 40 ms) in one bandwidth part.

The DRSs may be transmitted in a plurality of LBT subbands within one reference periodicity. For example, a plurality of DRS transmission windows may be configured in a plurality of LBT subbands by the above-described method. The base station may transmit DRS(s) to the terminal within one reference periodicity by using DRS resource(s) of one or a plurality of DRS transmission windows among the plurality of DRS transmission windows. In this case, the base station may select arbitrary DRS candidate(s) of all the DRS candidate(s) within the reference periodicity, and actually transmit the selected DRS candidate(s) to the terminal. Alternatively, the base station may select arbitrary DRS candidate(s) among the DRS candidate(s) (e.g., SS/PBCH block candidate(s)) that are configured to the terminal as actually transmitted, and transmit the selected DRS candidate(s) to the terminal. This method may be referred to as 'Method 130'.

Alternatively, a certain rule may place restrictions on the DRS candidate(s) that the base station can select and actually transmit. For example, the base station may transmit at most one DRS (e.g., at most one SS/PBCH block) to the terminal at one time point (e.g., certain symbols). The terminal may not expect that a plurality of DRSs having different frequency positions are transmitted at one time point (e.g., certain symbols) in one bandwidth part. When a plurality of DRSs are detected at a plurality of frequency positions at one time point, the terminal may select one of the plurality of detected DRSs and receive the same. This method may be referred to as 'Method 131'. When Method 131 is used, the one DRS may be arbitrarily selected by the terminal or selected by a predetermined rule or priority configuration from the base station. The restrictions may be applied when the DRS transmission windows for the respective subbands and the DRS candidates that they include overlap at least partially in the time domain.

Alternatively, the base station may transmit a plurality of DRSs (e.g., a plurality of SS/PBCH blocks) at the same time in a plurality of LBT subbands and/or a plurality of DRS transmission windows. That is, the terminal may expect to receive a plurality of DRSs (e.g., a plurality of SS/PBCH blocks) at the same time in the plurality of LBT subbands and/or the plurality of DRS transmission windows. This method may be referred to as 'Method 132'. Information on the plurality of LBT subbands and/or the plurality of DRS transmission windows may be signaled from the base station to the terminal.

Figure 15:
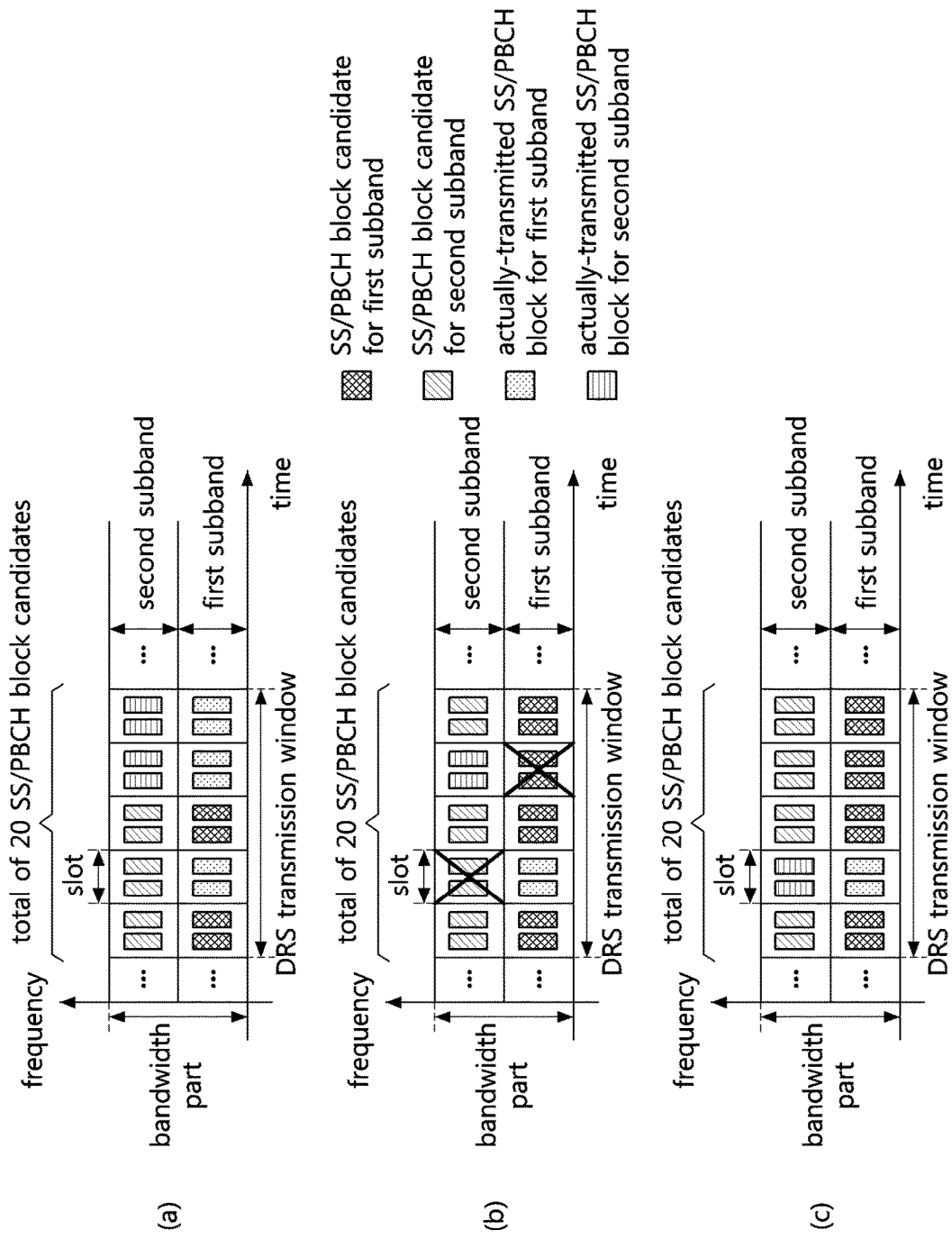
FIG. 15 is a conceptual diagram for describing exemplary embodiments of a DRS transmission method in a frequency and/or time domain.

FIG. 15 is a conceptual diagram for describing exemplary embodiments of a DRS transmission method in a frequency and/or time domain.

A case (a) of FIG. 15 shows a first exemplary embodiment of DRS transmission in the frequency and/or time domain, a case (b) of FIG. 15 shows a second exemplary embodiment of DRS transmission in the frequency and/or time domain, and a case (c) of FIG. 15 shows a third exemplary embodiment of DRS transmission in the frequency and/or time domain.

Referring to the cases (a) and (c) of FIG. 15, DRSs may be transmitted in a plurality of LBT subbands within one reference periodicity in one bandwidth part. According to the first exemplary embodiment of the case (a) of FIG. 15, the base station may succeed in the third or fourth category LBT operation in the first and second LBT subbands, and may transmit the DRSs for a relatively long time. Also, according to the second exemplary embodiment of the case (b) of FIG. 15 and the third exemplary embodiment of the case (c) of FIG. 15, the base station may succeed in the second category LBT operation in the first and second LBT subbands, and may transmit the DRS for a relatively short time. For convenience, only the SS/PBCH block is shown as an example of signals and channels constituting the DRS.

Referring to the case (a) of FIG. 15, the base station may transmit the DRSs in a plurality of frequency positions at one time point. This may be implemented by Method 130. Referring to the case (b) of FIG. 15, the base station may transmit the DRS in a single frequency position at one time point. This may be implemented by Method 131. Referring to the case (c) of FIG. 15, the base station may transmit the DRSs in a plurality of frequency positions at one time point. This may be implemented by Method 132.

The exemplary embodiment of the case (b) of FIG. 15 may help to transmit a larger number of DRSs in the time domain under the same frequency regulation condition. For example, as described above, a time for which the channel is occupied by the second category LBT based DRS is limited to 5% or less of the total time, and the maximum duration of each DRS burst may be 1 ms. In this case, assuming that the DRS periodicity is 20 ms and the downlink bandwidth part is configured to have a subcarrier spacing of 15 kHz, the base station may transmit at most two DRSs or SS/PBCH blocks within one DRS period through one subband. On the other hand, according to the exemplary embodiment of the case (b) of FIG. 15, the base station may perform the LBT operation twice within one DRS transmission window, and use two subbands to transmit two DRS or SS/PBCH blocks for each subband, a total of 4 DRSs or SS/PBCH blocks within one DRS periodicity. In this case, the frequency regulation condition may be applied to each subband, and the frequency regulation condition may be satisfied.

Alternatively, the frequency regulation condition may be applied for each bandwidth part. That is, in the second exemplary embodiment of the case (b) of FIG. 15, according to the above assumption, since a total of four DRSs are transmitted in one bandwidth part for a time of 2 ms within a DRS period of 20 ms, this may be determined as a frequency regulation violation. In this case, only one of the two DRS bursts may be transmitted such that the total duration of the DRS bursts within one period does not exceed 1 ms, which is 5% of 20 ms.

Alternatively, the DRS may be transmitted in up to S LBT subbands within one reference periodicity. For example, a plurality of DRS transmission windows are configured in a plurality of LBT subbands by the above-described method, and the base station may transmit the DRS(s) to the terminal by using DRS resource(s) of up to S DRS transmission windows among the plurality of DRS transmission windows within one reference periodicity. According to the method, the S available DRS transmission windows may be periodically hopped, that is, hopped between LBT subbands. This method may be referred to as 'Method 132'. According to an exemplary embodiment of Method 132, S=1. Method 132 may be used in combination with the above Method 130 and/or Method 131.

For example, even when the LBT succeeds in more than S subbands, the base station may transmit the DRS(s) only in up to S subbands among the subbands in which the LBT succeeds. The S subbands in which the DRS(s) are transmitted may be arbitrarily selected by the base station, that is, according to implementation of the base station. In this case, since the terminal does not know in which subband the DRS is transmitted, the terminal may attempt to receive the DRS(s) in the plurality of subbands. That is, the terminal may blindly detect the DRS(s) in the plurality of subbands. At the same time or in another manner, transmission priorities between the subbands constituting the bandwidth part may be configured to the terminal, and the DRS(s) may be transmitted in S subbands according to the priorities (e.g., having the highest priorities) among the subbands in which the LBT operations succeed. The transmission priorities may be defined or configured basically as limited to DRS transmission. Alternatively, the transmission priorities may be used for transmission other than DRS. For example, the priorities may be signaled to the terminal by the base station. For another example, the priorities may be determined based on the index of the LBT subband. As an example, a DRS of a lower index LBT subband may have a higher priority than a DRS of a higher index LBT subband.

According to the above-described method, there are a plurality of DRS transmission windows in the frequency domain within one bandwidth part, and the S available DRS transmission window(s) may be hopped between them. According to the results of the LBT operations, the hopping may be applied periodically and/or opportunistically. In this case, the plurality of DRS transmission windows may be independently configured for each frequency. For example, the DRS transmission window in the first LBT subband may be configured as the first DRS transmission window according to a DRS configuration parameter set for the first LBT subband, and the DRS transmission window in the second LBT subband may be configured as the second DRS transmission window according to a DRS configuration parameter set for the second LBT subband. In this case, the hopping of the available DRS transmission window(s) may be applied between a plurality of DRS configurations. Alternatively, the plurality of DRS transmission windows may be configured by one DRS configuration parameter set defined for each bandwidth part.

Figure 16:
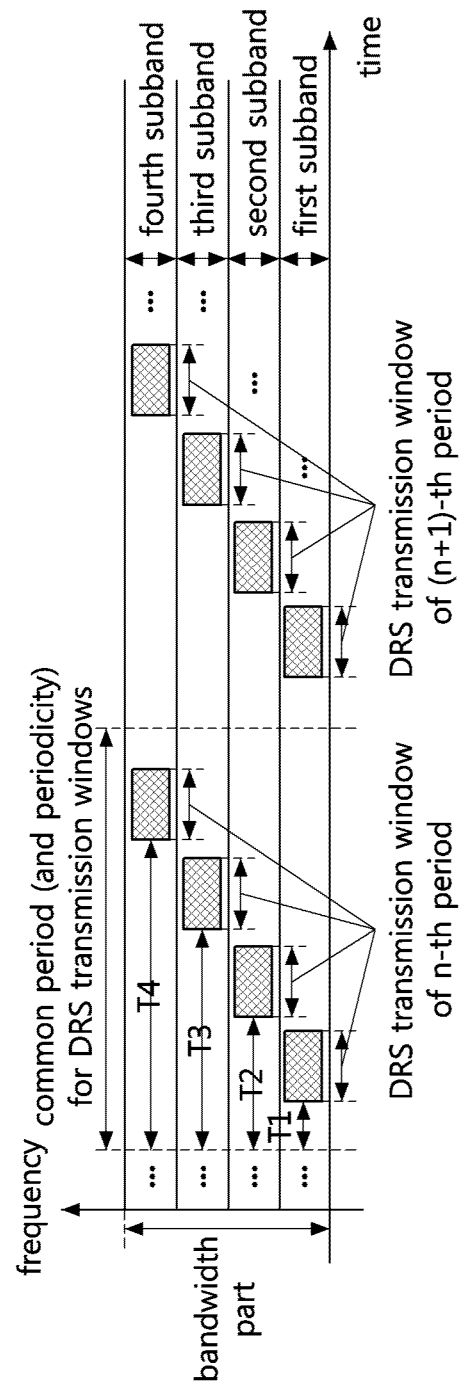
FIG. 16 is a conceptual diagram illustrating another exemplary embodiment of DRS transmission in a frequency and/or time domain.

FIG. 16 is a conceptual diagram illustrating another exemplary embodiment of DRS transmission in a frequency and/or time domain.

Referring to FIG. 16, one DRS configuration for a bandwidth part may include all DRS transmission window(s) in the bandwidth part, and the DRS transmission window(s) may be arranged in one or a plurality of LBT subbands. In this case, similarly to the exemplary embodiment of FIG. 13, a common DRS transmission window periodicity may be applied to DRS transmission of the base station and the terminal. The common DRS transmission window periodicity may be signaled from the base station to the terminal.

Figure 17:
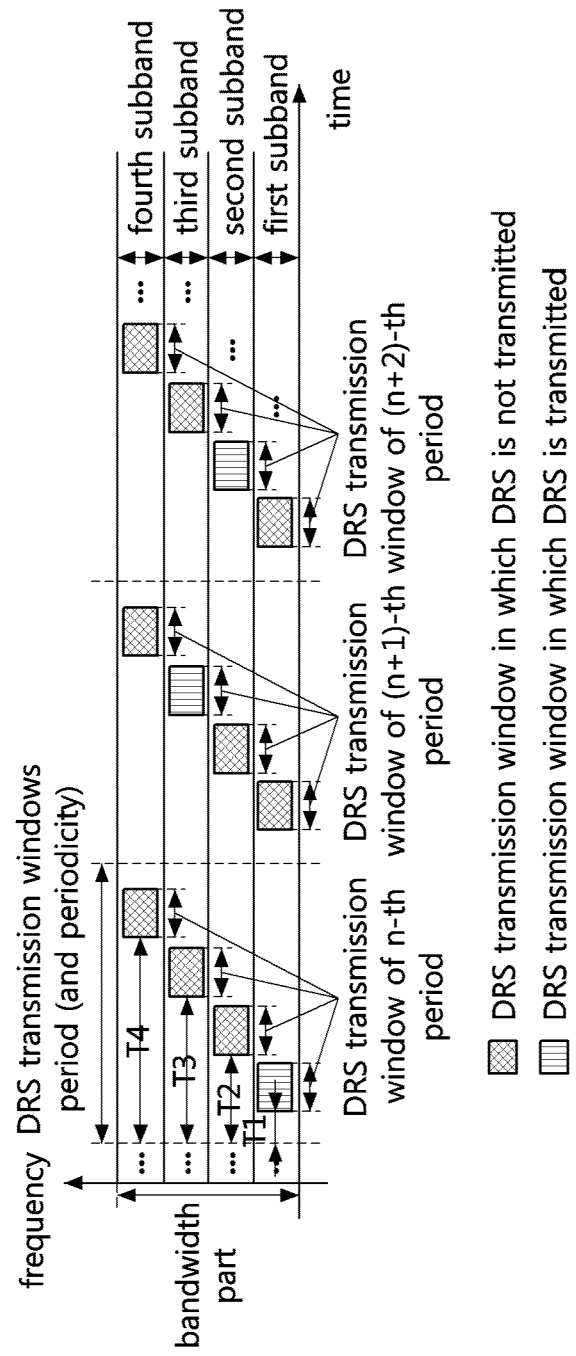
FIG. 17 is a conceptual diagram illustrating yet another exemplary embodiment of DRS transmission in a frequency and/or time domain.

FIG. 17 is a conceptual diagram illustrating yet another exemplary embodiment of DRS transmission in a frequency and/or time domain.

Referring to FIG. 17, one bandwidth part may be composed of four LBT subbands. A DRS transmission window may be configured in each LBT subband, and the DRS transmission window may be periodically arranged in each LBT subband. In addition, a common DRS transmission window periodicity (e.g., 40 ms) may be used for all LBT subbands by the above-described method. In this case, according to Method 132, the base station may transmit a DRS(s) in at most one LBT subband within each DRS transmission window period. Referring to FIG. 17, the base station may transmit a DRS in the DRS transmission window of the first subband in the n-th period, transmit a DRS in the DRS transmission window of the third subband in the (n+1)-th period, and transmit a DRS in the DRS transmission window of the second subband in the (n+2)-th period. That is, the DRS transmission window in which the DRS is transmitted may be hopped periodically and/or opportunistically between the plurality of LBT subbands. A hopping pattern of the DRS transmission windows may be dynamically determined by the base station according to the results of the LBT operations of the base station. In this case, the terminal may monitor or detect DRSs (e.g., SS/PBCH blocks) for the plurality of DRS transmission windows in the frequency domain. Alternatively, the base station may determine a hopping pattern of the DRS transmission windows in consideration of a hopping pattern, transmission priorities, or the like defined in advance or configured to the terminal from the base station. For example, the terminal may be configured by the base station the transmission priorities (or detection priorities) for the plurality of DRS transmission windows in the frequency domain, and the terminal may determine a monitoring or detection order for the plurality of DRS transmission windows based on the transmission priorities. In this case, depending on whether the LBT operation succeeds or not, the DRS may or may not be actually transmitted in the DRS transmission window determined by the pattern. In addition, unlike the exemplary embodiment of FIG. 17, the DRS or the DRS transmission window may be hopped only in a part of the subband(s) constituting the bandwidth part. For example, in the remaining subband(s), the DRSs may be transmitted for the terminal performing initial access in all DRS transmission windows in which the LBT operations are successful.

In the above-described method, the reference periodicity may be a periodicity of a DRS transmission window of a specific LBT subband. Alternatively, when a common DRS transmission window periodicity is used as in the exemplary embodiment of FIG. 13, the reference periodicity may be according to the common DRS transmission window periodicity. Alternatively, the reference periodicity may be a separate periodicity different from the periodicities of the DRS transmission windows. This may be signaled from the base station to the terminal.

As described above, when DRSs are transmitted in a plurality of LBT subbands within one bandwidth part, the terminal may regard the plurality of DRSs as cell-defining DRSs. Alternatively, when SS/PBCH blocks are transmitted in a plurality of LBT subbands within one bandwidth part as described above, the terminal may regard the plurality of SS/PBCH blocks as cell-defining SS/PBCH blocks. For example, the terminal may perform reception operations such as RRM measurement, RLM measurement, beam quality measurement, tracking of time and frequency synchronization, etc. by using the plurality of DRSs or the plurality of SS/PBCH blocks transmitted in the plurality of subbands. In this case, the terminal may assume that quasi-co-location (QCL) relationship is established between SS/PBCH blocks having the same index. When SS/PBCH blocks received in a plurality of frequency positions have the same index or have a QCL relationship with each other, the terminal may receive the SS/PBCH blocks by combining them. Through this, reception performance of the SS/PBCH blocks can be improved.

In the present specification, the expression the QCL is established between signals or channels may mean that the terminal can assume that the signals and channels have the same radio channel characteristics in a delay spread, Doppler spread, Doppler shift, average gain, average delay, spatial Rx parameter, reception beam characteristic, etc. In case of the NR, the QCL may include QCL-TypeA, QCL-TypeB, QCL-TypeC, and QCL-TypeD. The index of the SS/PBCH block may be an index for identifying a resource region to which the SS/PBCH block is mapped. Alternatively, the index of the SS/PBCH block may be an index for identifying a beam or QCL of the SS/PBCH block. The index for identifying the beam or QCL of the SS/PBCH block may be derived from the index for identifying the resource region of the SS/PBCH block. The QCL relationship between certain signals and/or channels may be predefined in the technical specification, or signaled explicitly or implicitly from the base station to the terminal. For example, transmission configuration information (TCI) state information configured from the base station to the terminal may include information on the QCL relationship and the signals and/or channels to which the QCL is applied.

Meanwhile, the DRSs may be transmitted only in L subband(s) occupied through the LBT operations among the K LBT subband(s) constituting the bandwidth part (here, L is a natural number equal to or less than K). Alternatively, the DRSs may be transmitted only in M subbands contiguous in the frequency domain among the subband(s) occupied by the successful LBT operations among the K LBT subband(s) constituting the bandwidth part (here, M is a natural number equal to or less than K). The LBT operation may be a random backoff based LBT operation (e.g., third or fourth category LBT). The LBT operation may also be an LBT operation without a random backoff (e.g., second category LBT). In this case, the number of LBT subbands in which the DRS can be transmitted within one COT may be further limited. This method may be referred to as Method 140. For example, the base station may transmit the DRSs in up to N subbands within one COT. N may be a natural number equal to or less than L or a natural number equal to or less than M. N may be predefined in the technical specification. In addition, N may be signaled to the terminal from the base station. According to an exemplary embodiment, N=1. In the following description, it is assumed that N=1. Similarly or alternatively, the terminal may assume that the DRS(s) are transmitted in up to N subbands within one COT. After the terminal successfully receives the DRS(s) in the N subbands, the terminal may not attempt DRS detection in the remaining subbands. In this case, the terminal may assume that DRS(s) are not transmitted in the remaining subbands.

Figure 18:
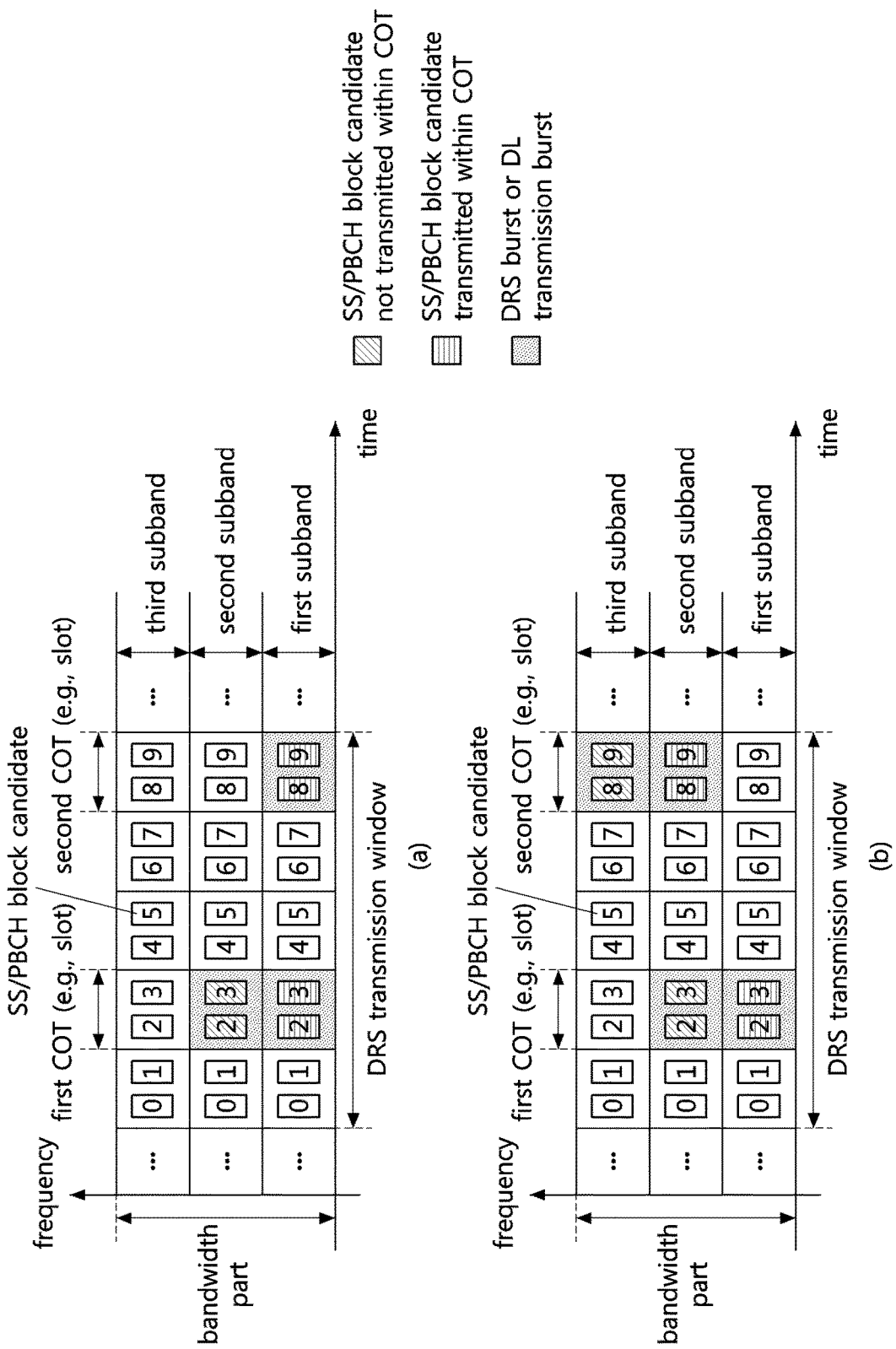
FIG. 18 is a conceptual diagram illustrating exemplary embodiments of a DRS transmission method in a wideband carrier.

FIG. 18 is a conceptual diagram illustrating exemplary embodiments of a DRS transmission method in a wideband carrier.

A case (a) of FIG. 18 shows a first exemplary embodiment of DRS transmission in a wideband carrier, and a case (b) of FIG. 18 shows a second exemplary embodiment of DRS transmission in a wideband carrier.

Referring to the cases (a) and (b) of FIG. 18, K=3. The base station may also succeed in two LBT operations within a certain DRS transmission window, and transmit DRS bursts in the second and fifth slots.

Referring to the cases (a) and (b) of FIG. 18, the first DRS burst may be transmitted in the first and second subbands (L=2 or M=2). In this case, according to Method 140, the base station may transmit the DRS only in one subband, that is, the first subband, among the subbands in which the first DRS burst is transmitted. When the terminal does not know at what time point in which subband the first DRS burst is transmitted (e.g., in case of transmission based on the second category LBT), the terminal may attempt to detect the DRS in each subband. In order to reduce the DRS detection complexity of the terminal, DRS transmission priorities between the subbands may be determined. The priorities may be configured from the base station to the terminal. Alternatively, the priorities may be predefined by the technical specification. For example, a subband with a lower index may have a higher priority. In this case, the terminal may attempt to sequentially detect the DRSs in the order of high priorities of the subbands, and if the DRS is detected in one subband (or N subband(s) in general), DRS detection can be omitted in the remaining subbands.

When a plurality of DRS bursts (and/or downlink transmission bursts) are transmitted within the same DRS transmission window or the same DRS periodicity, the DRS(s) may be transmitted in the same subband(s) in the plurality of DRS bursts. For example, referring to the case (a) of FIG. 18, the DRS may be transmitted in the first and second DRS bursts in the same subband, that is, the first subband. Alternatively, in the above case, it may be allowed to transmit the DRS(s) in a plurality of DRS bursts in different subband(s). For example, referring to the case (b) of FIG. 18, the DRSs may be transmitted in different subbands, that is, the first and second subbands in the first and second DRS bursts.

Method 140 and the methods applied to the above exemplary embodiments may be applied as limited to some signals or channels constituting the DRS. For example, the above-described methods may be applied as limited to the SS/PBCH block. For example, by Method 140, SS/PBCH blocks may be transmitted in up to N subbands among L or M occupied subband(s). For another example, according to Method 140, PDCCH, PDSCH, etc. may be transmitted in up to N subbands among L or M occupied subband(s). For example, the PDCCH may be a PDCCH for scheduling a PDSCH including SIB1, a PDCCH in which a CRC is scrambled by an SI-RNTI, or the like. For example, the PDSCH may be a PDSCH including a SIB1.

On the other hand, some signals constituting the DRS may be transmitted in subband(s) other than the N subband(s). For example, the some signals may include a PDSCH, a CSI-RS, and the like. The PDSCH may be a PDSCH including a SIB1. Alternatively, the PDSCH may be a PDSCH including a SIB other than a SIB1 or including a paging message. In addition, the some signals may include a PDCCH. Referring back to the case (a) of FIG. 18, within the first DRS burst, the base station may transmit some signals (e.g., an SS/PBCH block, a PDCCH belonging to a PDCCH search space set #0 or a Type0 PDCCH CSS set, a PDSCH, etc.) constituting the DRS only in the first subband, but transmit some other signals (e.g., PDSCH, CSI-RS, etc.) constituting the DRS in some or all of the first and second subbands. In this case, information (and resource allocation information thereof) on the subband(s) in which a PDSCH is scheduled or may be scheduled may be transmitted to the terminal on a PDCCH scheduling the PDSCH (e.g., a PDCCH transmitted in the PDCCH search space set #0, a PDCCH having a CRC scrambled by a SI-RNTI, etc.). Alternatively, the information on the subband(s) in which a PDSCH is scheduled or may be scheduled may be transmitted to the terminal through an SS/PBCH block (e.g., MIB included in the PBCH). The subband(s) in which the PDSCH is scheduled or may be scheduled may be some or all of subband(s) occupied by the corresponding DRS burst.

Figure 19:
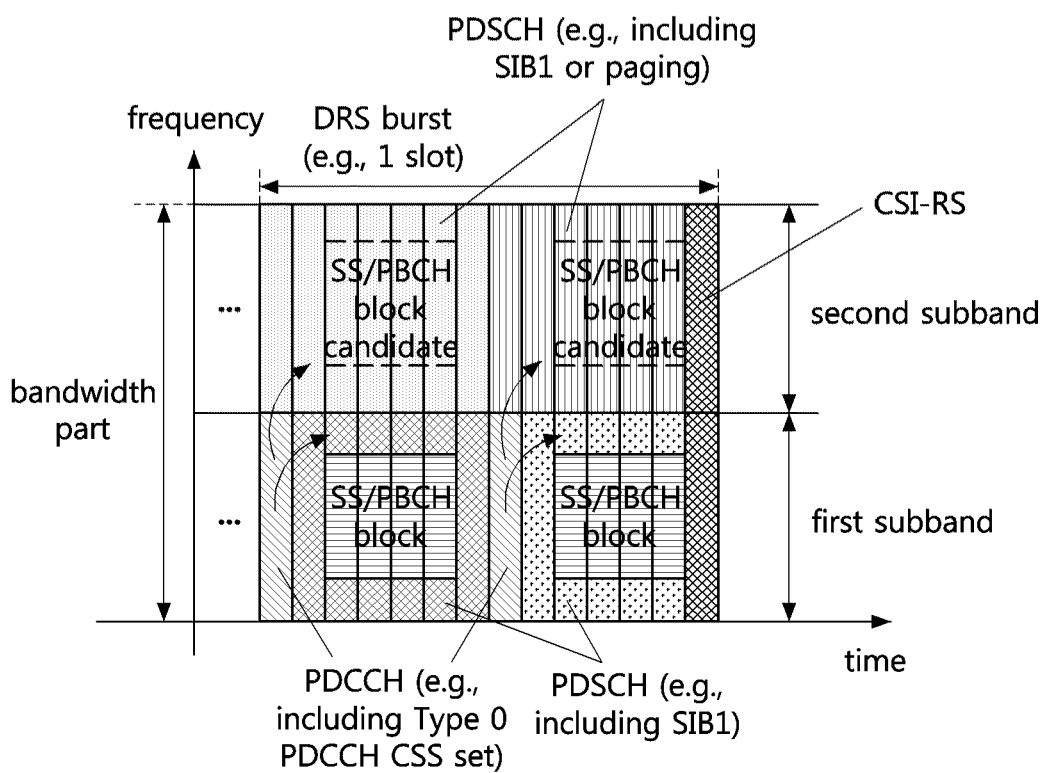
FIG. 19 is a conceptual diagram illustrating another exemplary embodiment of a DRS transmission method in a wideband carrier.

FIG. 19 is a conceptual diagram illustrating another exemplary embodiment of a DRS transmission method in a wideband carrier.

Referring to FIG. 19, the base station may succeed in the LBT operations and transmit a DRS burst in two frequency consecutive subbands. For example, the LBT operation may be a second category LBT operation, and a duration of the DRS burst may be 1 ms or less. For another example, the LBT operation may be a random backoff based LBT (e.g., fourth or third category LBT operation). In this case, according to the present exemplary embodiment, some signals constituting the DRS, that is, an SS/PBCH block, a PDCCH (e.g., a PDCCH transmitted through a PDCCH search space set #0, Type0 PDCCH CSS set, etc.), and a PDSCH (e.g., a PDSCH including an SIB1) may be transmitted in the first subband. In addition, some other signals constituting the DRS, that is, a PDSCH (e.g., another SIB other than SIB1, that is, a PDSCH including other system information (OSI) and a PDSCH including a paging message) may be transmitted in the second subband. In addition, some other signals that do not constitute the DRS, that is, a PDSCH (e.g., a PDSCH including unicast data, a PDSCH scheduled by DCI having a CRC scrambled by a C-RNTI, MCS-C-

RNTI, CS-RNTI, etc.) may be transmitted in the second subband. In this case, the PDSCH transmitted in the second subband may be scheduled by the PDCCH of the first subband. The terminal may rate-match the PDSCH received through the second subband with respect to SS/PBCH block candidates configured as SS/PBCH blocks actually transmitted in the second subband. In addition, some other signals constituting the DRS, that is, a CSI-RS may be transmitted in the first and second subbands. In the present exemplary embodiment, the first and second subbands may be generalized into a subband in which DRS (or SS/PBCH block) is transmitted and a subband in which DRS (or SS/PBCH block) is not transmitted, respectively.

In the exemplary embodiment of FIG. 19, when the first and second subbands are occupied by the second category LBT operations, if the frequency regulation condition is independently applied to each subband, a subband in which the specific signal(s) constituting the DRS are not transmitted may be interpreted as a violation of the regulations. For example, if the SS/PBCH block is not transmitted in the second subband and only the paging messaging or OSI is transmitted, this may be interpreted as a violation of the frequency regulation. In order to solve this problem, when a plurality of LBT subband(s) are occupied (at the same time) by the second category LBT operation, an SS/PBCH block may be transmitted in each subband. In this case, some subbands may further include a PDSCH including an SIB1 and a PDCCH corresponding thereto, and another subband may further include a PDSCH including a paging or OSI and a PDCCH corresponding thereto. That is, the SIB1 may be transmitted only in some subbands. In addition, different signals and channels may be additionally transmitted in addition to the SS/PBCH block for each subband. Alternatively, a new second category LBT scheme for multiple channels or multiple subbands may be defined, and the frequency regulation condition may be applied on a bandwidth part basis. In this case, the method applied to the exemplary embodiment of FIG. 19 may be effective.

DRS Measurement

Meanwhile, the terminal may perform DRS-based measurement. For example, the terminal may receive a part or all of the signals and channels constituting the DRS, and use the same to perform measurement of RRM, RLM, CSI, beam quality, and the like. To this end, the terminal may be configured by the base station a time window (hereinafter, referred to as 'DRS measurement window') for the DRS-based measurement. For example, the DRS measurement window may mean a time window configured by an SS/PBCH block measurement timing configuration (SMTC) (or DRS measurement timing configuration (DMTC)). The terminal may perform DRS based RRM measurement (e.g., RRM measurement using the SSS and/or the PBCH DM-RS) at least within the SMTC window, and may report a result to the base station. For another example, the DRS measurement window may mean a window for measuring the RLM of the terminal. The terminal may perform the DRS-based RLM at least within the RLM measurement window, determine an in-sync state or an out-of-sync state of the corresponding radio link, and report the same to a higher layer.

In this case, the terminal may be configured a plurality of DRS measurement windows in the frequency domain. When one bandwidth part is composed of a plurality of LBT subbands, the terminal may be configured a plurality of DRS measurement windows at different frequency positions in one bandwidth part. For example, a plurality of DRS measurement windows within one bandwidth part may be configured in different LBT subbands (or subbands corresponding to LBT subbands). The method of configuring the plurality of DRS measurement windows may be the same as or similar to the above-described method of configuring the DRS transmission window. For example, the method for configuring the length or duration, period, and time offset of the DRS measurement window(s) to the terminal may be the same as or similar to the above-described method for configuring the length or duration, period, and time offset of the DRS transmission window(s) to the terminal. In addition, the terminal may assume that the DRS measurement window and the DRS transmission window are the same in at least some subband(s). This assumption may be valid (as default configuration) until the terminal is configured by the base station the DRS measurement window in the corresponding subband(s).

Although the above-described contents of the present invention have been described as an example in which one DRS is configured and/or transmitted in the frequency domain within one LBT subband, the method or the exemplary embodiment is not limited thereto, but may also be easily extended to a case where a plurality of DRSs are configured and/or transmitted in the frequency domain within one LBT subband or within a bandwidth part in which an LBT subband is not configured. For example, a plurality of DRS transmission windows or a plurality of DRS measurement windows may be configured at different frequency positions within one LBT subband. The plurality of DRS transmission windows or the plurality of DRS measurement windows may be configured not to overlap each other in the frequency domain. In this case, the above-described methods may be applied identically or similarly for configuration of the DRS transmission windows or DRS measurement windows, transmission of the DRS, and the like. In addition, the above-described methods may be applied to only some subbands constituting the bandwidth part.

PDSCH Rate Matching

As described above, the base station may configure actually-transmitted SS/PBCH block(s) among a plurality of SS/PBCH block candidates to the terminal. The plurality of SS/PBCH block candidates may be SS/PBCH block candidates constituting a DRS occasion, a DRS transmission window, an SS/PBCH block burst set, or the like. The actually-transmitted SS/PBCH block(s) may be configured to the terminal through RRC signaling (e.g., RRC parameter 'ssb-PositionsInBurst'). In this case, the RRC signaling may be cell-specific (e.g., as included in the SIB1) or terminal-specific (e.g., as included in an RRC parameter 'ServingCellConfigCommon'). The terminal may receive a PDSCH by rate-matching the PDSCH around a resource region of SS/PBCH block(s) configured as the actually-transmitted SS/PBCH block(s). In this case, the base station may not actually transmit the SS/PBCH block configured as the actually-transmitted SS/PBCH block to the terminal. However, the terminal may rate-match the PDSCH around the resource of the SS/PBCH block regardless of whether or not it is actually transmitted.

Meanwhile, in unlicensed band communications, the DRS may be transmitted based on a plurality of LBT categories. For example, the base station may perform a second category LBT operation, acquire a channel, and transmit a DRS. Alternatively, the base station may perform a third or fourth category LBT operation, acquire a channel, and transmit a DRS. In this case, configurations of the actually-transmitted SS/PBCH block in the two cases may be different. This will be described below with reference to the drawings.

Figure 20:
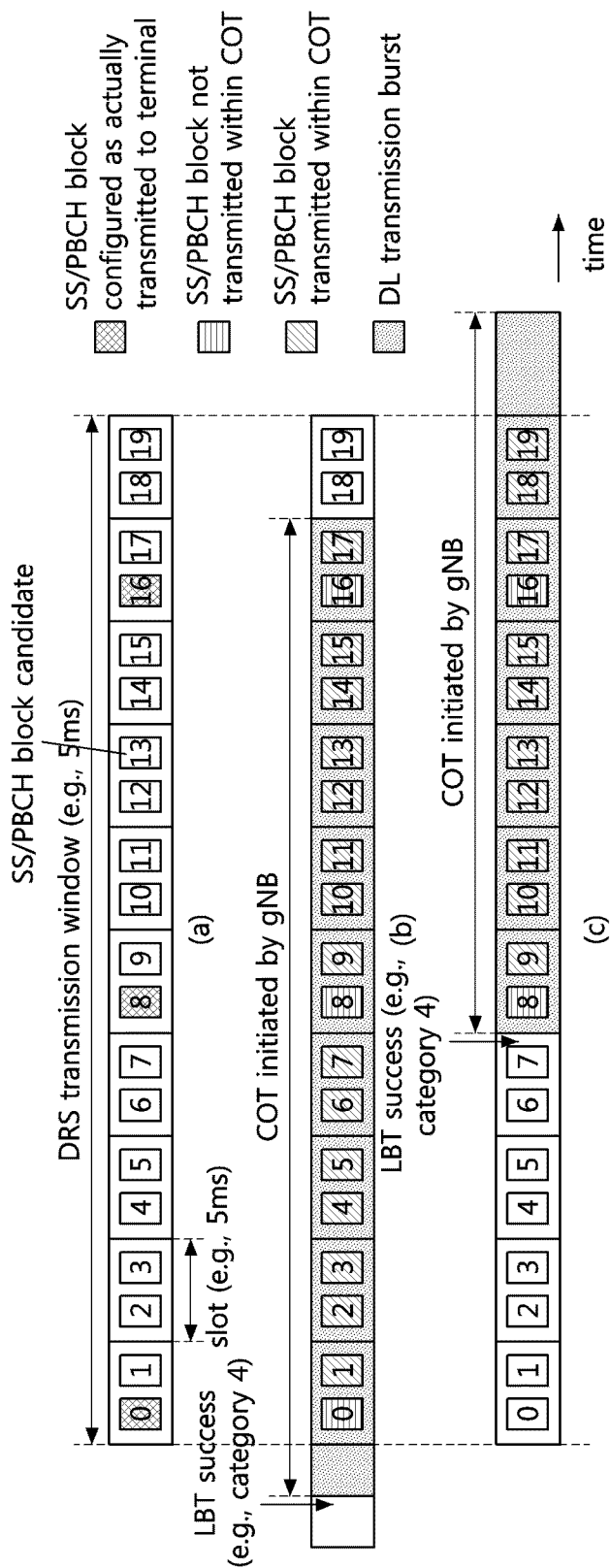
FIG. 20 is a conceptual diagram for describing exemplary embodiments of configuration of SS/PBCH blocks actually transmitted in an unlicensed band.

FIG. 20 is a conceptual diagram for describing exemplary embodiments of configuration of SS/PBCH blocks actually transmitted in an unlicensed band.

A case (a) of FIG. 20 shows a first exemplary embodiment of configuration of actually-transmitted SS/PBCH blocks for an unlicensed band, a case (b) of FIG. 20 shows a first exemplary embodiment of an SS/PBCH block transmission according to an LBT, and a case (c) of FIG. 20 shows a second exemplary embodiment of an SS/PBCH block transmission according to an LBT.

First, referring to the cases (b) and (c) of FIG. 20, the base station may perform a random backoff based LBT operation (e.g., fourth category LBT operation), acquire a channel, and transmit a downlink transmission burst. In this case, if an interval of the downlink transmission burst, that is, a COT includes a DRS transmission window, the base station may transmit a DRS or SS/PBCH block within the COT. The base station may also transmit other downlink signals, such as a PDCCH, a PDSCH, a CSI-RS, etc., together with the DRS or SS/PBCH block within the COT.

Typically, the COT initiated through the random backoff based LBT operation may have a longer duration than a COT initiated through an LBT operation without a random backoff. Accordingly, in the exemplary embodiments of the cases (b) and (c) of FIG. 20, a plurality of DRS candidates or a plurality of SS/PBCH block candidates may be included within one COT. For example, referring to the case (b) of FIG. 20, 18 SS/PBCH block candidates, that is, SS/PBCH block candidates having indexes 0 to 17, may be included within the COT. Referring to the case (c) of FIG. 20, 12 SS/PBCH block candidates, that is, SS/PBCH block candidates having indexes 8 to 19, may be included within the COT.

In this case, the base station may actually transmit only some of the SS/PBCH block candidates included within the COT. For example, in case of a serving cell or system in which a single beam is used for transmission of SS/PBCH blocks, it may be sufficient that one or a few SS/PBCH blocks are actually transmitted. Accordingly, referring to the case (b) of FIG. 20, the base station may actually transmit only some of the 18 SS/PBCH block candidates belonging to the COT, that is, SS/PBCH blocks having indexes 0, 8, and 16. In addition, referring to the case (c) of FIG. 20, the base station may actually transmit only some of the 12 SS/PBCH block candidates belonging to the COT, that is, SS/PBCH blocks having indexes 8 and 16.

In this case, in order to make it possible for the terminal to rate-match a PDSCH to the SS/PBCH block(s) that the base station actually transmits or can actually transmit, i.e., the SS/PBCH blocks having the indexes 0, 8, and 16, the actually-transmitted SS/PBCH block(s) may be signaled to the terminal. Referring to the case (a) of FIG. 20, the base station may configure the SS/PBCH blocks having the indexes 0, 8 and 16 among the total of 20 SS/PBCH block candidates constituting the DRS transmission window to the terminal as the actually-transmitted SS/PBCH blocks according to the above-described method.

Figure 21:
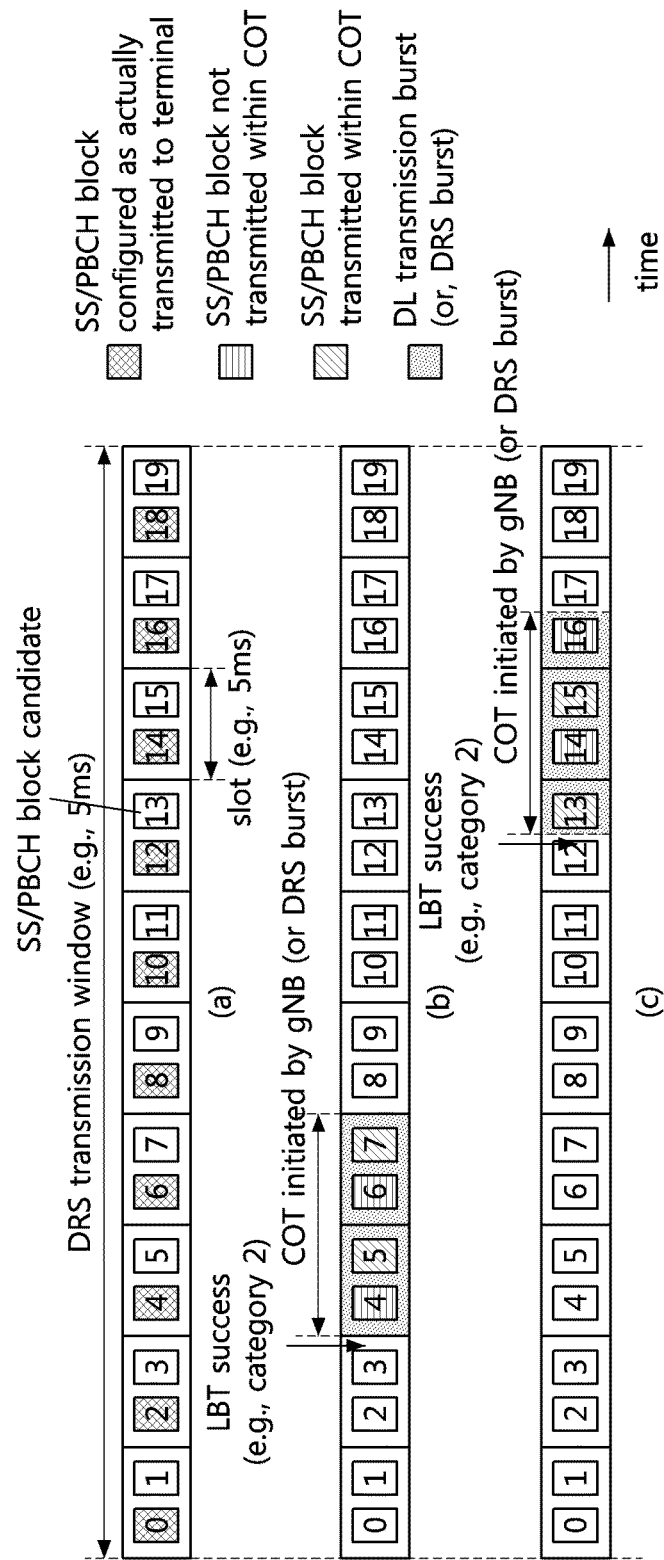
FIG. 21 is a conceptual diagram for describing other exemplary embodiments of configuration of SS/PBCH blocks actually transmitted in an unlicensed band.

FIG. 21 is a conceptual diagram for describing other exemplary embodiments of configuration of SS/PBCH blocks actually transmitted in an unlicensed band.

A case (a) of FIG. 21 shows a second exemplary embodiment of configuration of actually-transmitted SS/PBCH blocks for an unlicensed band, a case (b) of FIG. 21 shows a third exemplary embodiment of configuration of actually-transmitted SS/PBCH blocks for an unlicensed band, and a case (c) of FIG. 21 shows a fourth exemplary embodiment of configuration of actually-transmitted SS/PBCH blocks for an unlicensed band.

First, referring to the cases (b) and (c) of FIG. 21, the base station may perform an LBT operation without a random backoff (e.g., second category LBT operation), acquire a channel, and transmit a downlink transmission burst or a DRS burst. In this case, as described above, the maximum duration of the DRS burst may be limited (e.g., 1 ms), and thus, one DRS burst may include a few DRS candidates or a few SS/PBCH block candidates. For example, referring to the case (b) of FIG. 21, four SS/PBCH block candidates, that is, SS/PBCH block candidates having indexes 4 to 7, may be included in the DRS burst, and referring to the case (c) of FIG. 21, four SS/PBCH block candidates, that is, SS/PBCH block candidates having indexes 13 to 16, may be included in the DRS burst.

In this case, the base station may actually transmit a part or all of the SS/PBCH block candidates included within the COT. For example, referring to the cases (b) and (c) of FIG. 21, the base station may actually transmit only two SS/PBCH blocks with even indexes among the four SS/PBCH blocks included in the DRS burst regardless of a starting time point of the DRS burst. In this case, in order to enable the terminal to rate-match a PDSCH to the SS/PBCH blocks having even indexes actually transmitted by the base station, regardless of the starting time point of the DRS burst, as in the exemplary embodiment of the case (a) of FIG. 21, all SS/PBCH blocks having even indexes in the DRS transmission window may be configured to the terminal as the actually-transmitted SS/PBCH blocks.

According to the above-described method, a part or all of the SS/PBCH blocks constituting the DRS transmission window may be configured to the terminal as the actually-transmitted SS/PBCH blocks. This may be applied always identically regardless of the category of LBT operation performed for DRS transmission. This method may be referred to as 'Method 150'. Alternatively, when the DRS transmission is performed by the second category LBT operation, a part or all of the SS/PBCH blocks constituting the DRS burst may be configured to the terminal as the actually-transmitted SS/PBCH blocks. However, this method may not work when the terminal does not know the starting time point of the DRS burst. On the other hand, according to Method 150, since the terminal knows absolute positions of the SS/PBCH block(s) actually transmitted within the DRS transmission window, even when the terminal does not know the starting time point of the DRS burst, the terminal may correctly rate-match the PDSCH on the corresponding resource.

Meanwhile, when comparing the exemplary embodiment of the case (a) of FIG. 20 and the exemplary embodiment of the case (a) of FIG. 21, sets of SS/PBCH block candidate(s) configured to the terminal as the actually-transmitted SS/PBCH blocks may be different for the case where the random backoff-based LBT is performed for DRS transmission and the case where the LBT operation without a random backoff is performed for DRS transmission. For example, referring to the case (a) of FIG. 20 and the case (a) of FIG. 21, in the latter case, it may be helpful for a larger number of SS/PBCH block candidates to be configured as the actually-transmitted SS/PBCH blocks. In a proposed method, the base station may configure a set of the actually-transmitted SS/PBCH block(s), i.e., a PDSCH rate-matching pattern for the SS/PBCH block(s) differently for the case where the random backoff-based LBT (e.g., fourth or third category LBT operation) is performed for DRS transmission and the case where the LBT operation without a random backoff (e.g., second category LBT operation) is performed for DRS transmission. This method may be referred to as 'Method 151'. The sets of actually-transmitted SS/PBCH block(s) configured for the former and latter cases will be denoted S1 and S2, respectively.

The SS/PBCH block candidate(s), e.g., S1 and/or S2, which are configured as the actually-transmitted SS/PBCH blocks, may be signaled to the terminal through a bitmap. For example, the size of the bitmap may be equal to the number of SS/PBCH block candidates constituting the DRS transmission burst, and each bit may sequentially correspond to each SS/PBCH block candidate. Alternatively, the size of the bitmap may be smaller than the number of SS/PBCH block candidates constituting the DRS transmission burst in order to reduce signaling overhead. For example, each bit of the bitmap may sequentially correspond to each set of SS/PBCH block candidate(s) having the same beam index. The beam index of the SS/PBCH block is merely a term for convenience and may actually be an index indicating a QCL or TCI state of the SS/PBCH block. The SS/PBCH blocks having the same beam index may be QCLed to each other or may be applied the same TCI state information. That is, the terminal may assume that the SS/PBCH blocks having the same beam index, or SSSs, PBCH DM-RSs, etc. constituting the SS/PBCH blocks are QCLed with each other. The QCL relationship between the SS/PBCH blocks may be signaled from the base station to the terminal. For example, the terminal may assume that SS/PBCH blocks having the same PBCH DM-RS sequence are QCLed within the same DRS transmission window and/or between the DRS transmission windows of different periodicities. In this case, for example, when eight DM-RS sequences are used for indicating an index of an SS/PBCH block and/or an index of a beam, the length of the bitmap may be 8 bits. On the other hand, only some bit(s) of the bits constituting the bitmap may be used for configuring the actually-transmitted SS/PBCH blocks. For example, only Y bit(s) among the bits constituting the bitmap having the length of X may be used for configuring the actually-transmitted SS/PBCH blocks. The Y bit(s) may correspond to Y SS/PBCH block indexes and/or beam indexes. For example, X may be 8 and Y may be 1, 2, 4, or 8. The remaining unused (X-Y) bit(s) may be transmitted as set to a predefined value (e.g., '0').

As can be seen from the above exemplary embodiments, more SS/PBCH block candidates may be configured as the actually-transmitted SS/PBCH blocks for the DRS transmission by the second category LBT operation than the DRS transmission by the fourth or third category LBT operation. In this case, an inclusion relationship may be established between S1 and S2. For example, S1 may be a subset of S2.

For Method 151, the terminal may distinguish the DRS transmission by the second category LBT operation from the DRS transmission by the fourth (or third) category LBT operation through reception of a downlink signal. For example, when the terminal receives a downlink initial signal and/or information on the structure and the duration of the COT, the terminal may regard a downlink transmission burst or a DRS burst received from a time point of the reception as transmission according to the fourth (or third) category LBT operation. In addition, if the terminal succeeds in detecting or receiving a DRS, e.g., an SS/PBCH block, without receiving the downlink initial signal and/or the information on the structure and duration of the COT (outside the COT), the terminal may regard the downlink transmission burst or DRS burst including the same as transmission according to the second category LBT operation. Through this method, the terminal may distinguish LBT categories, and receive a PDSCH by applying a PDSCH rate-matching pattern corresponding to each LBT category.

The downlink initial signal may be used for downlink transmission burst detection of the terminal. The downlink initial signal may be placed at the beginning of the downlink transmission burst. By successfully detecting the downlink initial signal, the terminal may detect the downlink transmission burst and perform reception operations such as PDCCH monitoring. Various downlink signals and channels may be used as the downlink initial signal. For example, a DM-RS for demodulating a PDCCH may be used as the downlink initial signal. Alternatively, a wideband DM-RS of a CORESET may be used as the downlink initial signal. In this case, the wideband DM-RS may not be used for demodulating a PDCCH. Alternatively, a DM-RS of a group common PDCCH may be used as the downlink initial signal. Alternatively, a DM-RS of a group common PDCCH and control information included in the group common PDCCH may be used as the downlink initial signal. Alternatively, a wideband DM-RS of a group common PDCCH and control information included in the group common PDCCH may be used as the downlink initial signal. In this case, the terminal may detect the downlink transmission burst when successfully receiving the group common DCI (e.g., when cyclic redundancy check (CRC) is successful). Alternatively, a CSI-RS may be used as the downlink initial signal.

Configuration of an Apparatus According to the Present Invention

Figure 22:
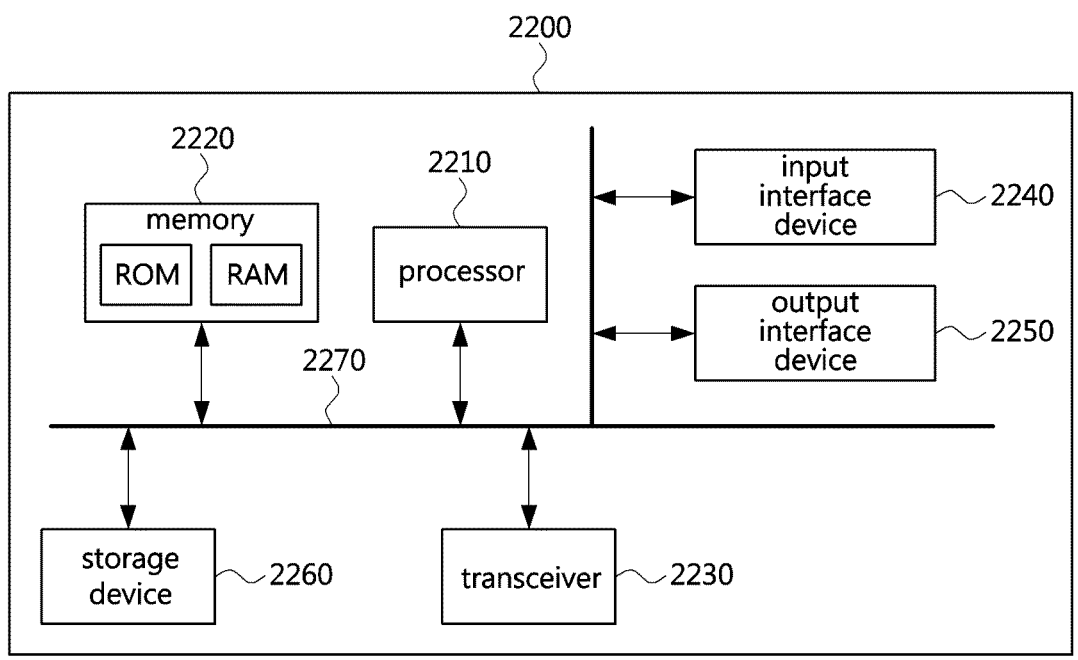
FIG. 22 is a block diagram illustrating a communication node according to exemplary embodiments of the present invention.

FIG. 22 is a block diagram illustrating a communication node according to exemplary embodiments of the present invention.

The communication node exemplified in FIG. 22 may be a terminal or a base station, as an apparatus performing the methods according to the exemplary embodiments of the present invention.

Referring to FIG. 22, a communication node 2200 may include at least one processor 2210, a memory 2220, and a transceiver 2230 connected to a network to perform communication. In addition, the communication node 2200 may further include an input interface device 2240, an output interface device 2250, a storage device 2260, and the like. The components included in the communication node 2200 may be connected by a bus 2270 to communicate with each other.

However, each component included in the communication node 2200 may be connected to the processor 2210 through a separate interface or a separate bus instead of the common bus 2270. For example, the processor 2210 may be connected to at least one of the memory 2220, the transceiver 2230, the input interface device 2240, the output interface device 2250, and the storage device 2260 through a dedicated interface.

The processor 2210 may execute at least one instruction stored in at least one of the memory 2220 and the storage device 2260. The processor 2210 may refer to a central processing unit (CPU), a graphics processing unit (GPU), or a dedicated processor on which the methods according to the exemplary embodiments of the present invention are performed. Each of the memory 2220 and the storage device 2260 may be configured as at least one of a volatile storage medium and a nonvolatile storage medium. For example, the memory 2220 may be configured with at least one of a read only memory (ROM) and a random access memory (RAM).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A method of a terminal, comprising:
   receiving first configuration information on a carrier from a base station;
   identifying some resource block(s) (RB(s)) among RBs constituting the carrier as a guard band;
   receiving second configuration information from the base station, and determining a first time period and a second time period based on the second configuration information; and
   performing communication with the base station based on a first RB group in the first time period and based on a second RB group in the second time period,
   wherein the first RB group comprises RB(s) excluding RB(s) constituting the guard band among the RBs constituting the carrier, the second RB group comprises RB(s) including the RB(s) constituting the guard band among the RBs constituting the carrier, and the communication with the base station includes transmission of a data channel.

2. The method according to claim 1, wherein in the first time period, the first RB group includes a first subband and a second subband, and the guard band is located between the first subband and the second subband.

3. The method according to claim 2, wherein the RB(s) constituting the guard band are determined based on third configuration information explicitly received from the base station, or determined based on frequency locations of the first subband and the second subband.

4. The method according to claim 1, wherein the second RB group coincides with an active bandwidth part in the carrier.

5. The method according to claim 1, wherein the second configuration information includes a time offset from a reference time, which indicates a time of transition from the second time period to the first time period, and the second configuration information is received from the base station through a radio resource control (RRC) message.

6. The method according to claim 1, wherein the data channel is allocated in only one of the first time period and the second time period.

7. The method according to claim 1, wherein when the data channel is allocated in both the first time period and the second time period, the terminal skips the transmission of the data channel.

8. The method according to claim 1, wherein the data channel is allocated in the first time period, the data channel is mapped to physical resource block(s) (PRB(s)) constituting the first RB group, and the PRB(s) are indicated to the terminal based on indices assigned within the first RB group.

9. The method according to claim 1, wherein the data channel is allocated in the second time period, the data channel is mapped to PRB(s) constituting the second RB group, and the PRB(s) are indicated to the terminal based on indices assigned within the second RB group.

10. The method according to claim 1, wherein when the data channel is allocated in the first time period and the data channel is nominally allocated to PRB(s) constituting the second RB group, the terminal receives the data channel in RB(s) excluding the RB(s) constituting the guard band.

11. The method according to claim 10, wherein the data channel is rate-matched around the RB(s) constituting the guard band, or punctured with respect to the RB(s) constituting the guard band.

12. The method according to claim 1, wherein the data channel is repeatedly transmitted, a first data channel instance and a second data channel instance constituting repeated transmission of the data channel are respectively transmitted in the first time period and the second time period, and a frequency resource region to which the first data channel instance is mapped is equal to a frequency resource region to which the second data channel instance is mapped.

13. The method according to claim 1, wherein the data channel is repeatedly transmitted, both of a first data channel instance and a second data channel instance constituting repeated transmission of the data channel are received in one of the first time period and the second time period, and a frequency resource region to which the first data channel instance is mapped is equal to a frequency resource region to which the second data channel instance is mapped.

14. The method according to claim 1, wherein the data channel is a physical uplink shared channel (PUSCH), and the transmission of the data channel is indicated to the terminal by a dynamic scheduling or a semi-persistent scheduling.

15. A method of a base station, comprising:
   transmitting first configuration information on a carrier to a terminal;
   transmitting second configuration information to the terminal, the second configuration information allowing the terminal to determine a first time period and a second time period; and
   performing communication with the terminal based on a first RB group in the first time period and based on a second RB group in the second time period,
   wherein the first RB group comprises RB(s) excluding RB(s) constituting the guard band among the RBs constituting the carrier, the second RB group comprises RB(s) including the RB(s) constituting the guard band among the RBs constituting the carrier, and the communication with the base station includes reception of a data channel.

16. The method according to claim 15, wherein in the first time period, the first RB group includes a first subband and a second subband, and the guard band is located between the first subband and the second subband.

17. The method according to claim 15, wherein the second configuration information includes a time offset from a reference time, which indicates a time of transition from the second time period to the first time period, and the second configuration information is received from the base station through a radio resource control (RRC) message.

18. The method according to claim 15, wherein the data channel is allocated in only one of the first time period and the second time period.

19. The method according to claim 15, wherein the data channel is repeatedly received, a first data channel instance and a second data channel instance constituting repeated reception of the data channel are respectively received in the first time period and the second time period, and a frequency resource region to which the first data channel instance is mapped is equal to a frequency resource region to which the second data channel instance is mapped.

20. The method according to claim 15, wherein the data channel is repeatedly received, both of a first data channel instance and a second data channel instance constituting repeated reception of the data channel are received in one of the first time period and the second time period, and a frequency resource region to which the first data channel instance is mapped is equal to a frequency resource region to which the second data channel instance is mapped.

* * * * *